(12) United States Patent
Funk et al.

(10) Patent No.: US 9,369,740 B1
(45) Date of Patent: Jun. 14, 2016

(54) CUSTOM MEDIA PLAYER

(75) Inventors: Gregory Allan Funk, San Francisco, CA (US); Nareshkumar Rajkumar, San Jose, CA (US); Vincent Gatto, Jr., San Francisco, CA (US); Theodore Kent Hamilton, Küsnacht (CH)

(73) Assignee: GOOGLE INC., Mountain View, CA (US)

( * ) Notice: Subject to any disclaimer, the term of this patent is extended or adjusted under 35 U.S.C. 154(b) by 339 days.

(21) Appl. No.: 13/529,732

(22) Filed: Jun. 21, 2012

(51) Int. Cl.
*G06F 15/173* (2006.01)
*H04N 21/20* (2011.01)
*G06Q 30/02* (2012.01)

(52) U.S. Cl.
CPC ........... *H04N 21/20* (2013.01); *G06Q 30/0241* (2013.01)

(58) Field of Classification Search
None
See application file for complete search history.

(56) References Cited

U.S. PATENT DOCUMENTS

| | | | | | |
|---|---|---|---|---|---|
| 8,271,646 | B2* | 9/2012 | Brown | ................ | H04L 41/0806 709/219 |
| 8,510,644 | B2* | 8/2013 | Rajkumar | ......... | G06F 17/30781 715/201 |
| 2003/0061280 | A1* | 3/2003 | Bulson | .............. | H04L 29/06027 709/203 |
| 2005/0138083 | A1* | 6/2005 | Smith-Semedo | ......... | G06F 1/14 |
| 2007/0038931 | A1* | 2/2007 | Allaire | ............... | G06Q 30/0239 715/206 |
| 2007/0255621 | A1* | 11/2007 | Mason | ................... | G06Q 30/02 705/14.41 |
| 2008/0046948 | A1* | 2/2008 | Verosub | ............ | G06F 17/30867 725/117 |
| 2009/0327035 | A1* | 12/2009 | Allard | .................... | G06Q 10/00 705/7.29 |
| 2010/0010884 | A1* | 1/2010 | Cohee | .................... | G06Q 30/02 705/14.12 |
| 2010/0114857 | A1* | 5/2010 | Edwards | ........... | G06F 17/30817 707/709 |
| 2012/0042309 | A1* | 2/2012 | Risan | .................... | H04L 63/102 717/175 |
| 2012/0117262 | A1* | 5/2012 | Deng | .................. | H04L 65/4084 709/231 |
| 2012/0179788 | A1* | 7/2012 | McGowan | ....... | H04N 21/44222 709/219 |
| 2012/0203853 | A1* | 8/2012 | Davis | ................... | G06Q 10/107 709/206 |
| 2012/0226678 | A1* | 9/2012 | Park | ....................... | G06Q 10/10 707/709 |
| 2013/0007235 | A1* | 1/2013 | Humphreys | ...... | G06F 17/30902 709/223 |
| 2013/0031216 | A1* | 1/2013 | Willis | ..................... | H04L 67/02 709/219 |
| 2013/0046778 | A1* | 2/2013 | Higgins | ............ | G06F 17/30867 707/767 |
| 2013/0226983 | A1* | 8/2013 | Beining | ............... | H04N 21/252 709/201 |
| 2013/0238757 | A1* | 9/2013 | Cho | .................... | H04L 65/1089 709/218 |

* cited by examiner

*Primary Examiner* — Joseph E Avellino
*Assistant Examiner* — Phyllis A Book
(74) *Attorney, Agent, or Firm* — Lowenstein Sandler LLP

(57) ABSTRACT

A system and method for providing web analytics for a custom media player is disclosed. The system comprises a communication module, a request analysis module and a reporting module. The communication module receives a request from a custom media player. The custom media player is stored and executed on a client device. The request analysis module determines whether the request includes a custom event for a social feature included in the custom media player. The request analysis module determines that the request includes a custom event. The request analysis module stores event data describing the custom event in a storage device. The reporting module generates a report describing a metric for the social feature.

14 Claims, 17 Drawing Sheets

CUSTOM MEDIA PLAYER

TECHNICAL FIELD

The present disclosure generally relates to web analytics, and, more specifically, providing web analytics for custom events generated by a custom media player.

BACKGROUND

Entities that publish content, such as video data, to one or more websites typically desire analytics data about the published content. For example, if video data is published to one or more websites, the publishers may seek information about the number of times the video data is viewed. If the video data is functioning as an advertisement, the publisher may want to know the number of users watching the video data or other metrics describing performance of the video data. In some scenarios, the publishers may also desire to customize a media player so that the media player meets some special requirements or performs some customized functions when playing video data. For example, the publishers may prefer to add one or more interesting features to the media player to promote video views.

However, existing technologies for presenting video data via a media player do not allow publishers to customize the media player. For example, existing technologies only provide a locked media player to a publisher and it is impossible for the publisher to change the settings of the media player or add any customized features to the media player.

Additionally, existing technologies do not provide functionalities to track any interaction in the media player caused by features customized by the publisher. For example, existing technologies does not track user interaction with a customized feature in the custom media player and fails to provide any report to a publisher regarding performance of the customized feature on video access.

SUMMARY

Embodiments disclosed herein provide a system and method for providing web analytics for custom events generated by a custom media player. The system comprises a communication module, a request analysis module and a reporting module. The communication module receives a request from a custom media player. The custom media player is stored and executed on a client device. The request analysis module determines whether the request includes a custom event for a social feature included in the custom media player. The request analysis module determines that the request includes a custom event. The request analysis module stores event data describing the custom event in a storage device. The reporting module generates a report describing a metric for the social feature.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

Embodiments are illustrated by way of example, and not by way of limitation in the figures of the accompanying drawings in which like reference numerals are used to refer to similar elements.

DETAILED DESCRIPTION

Figure 1:
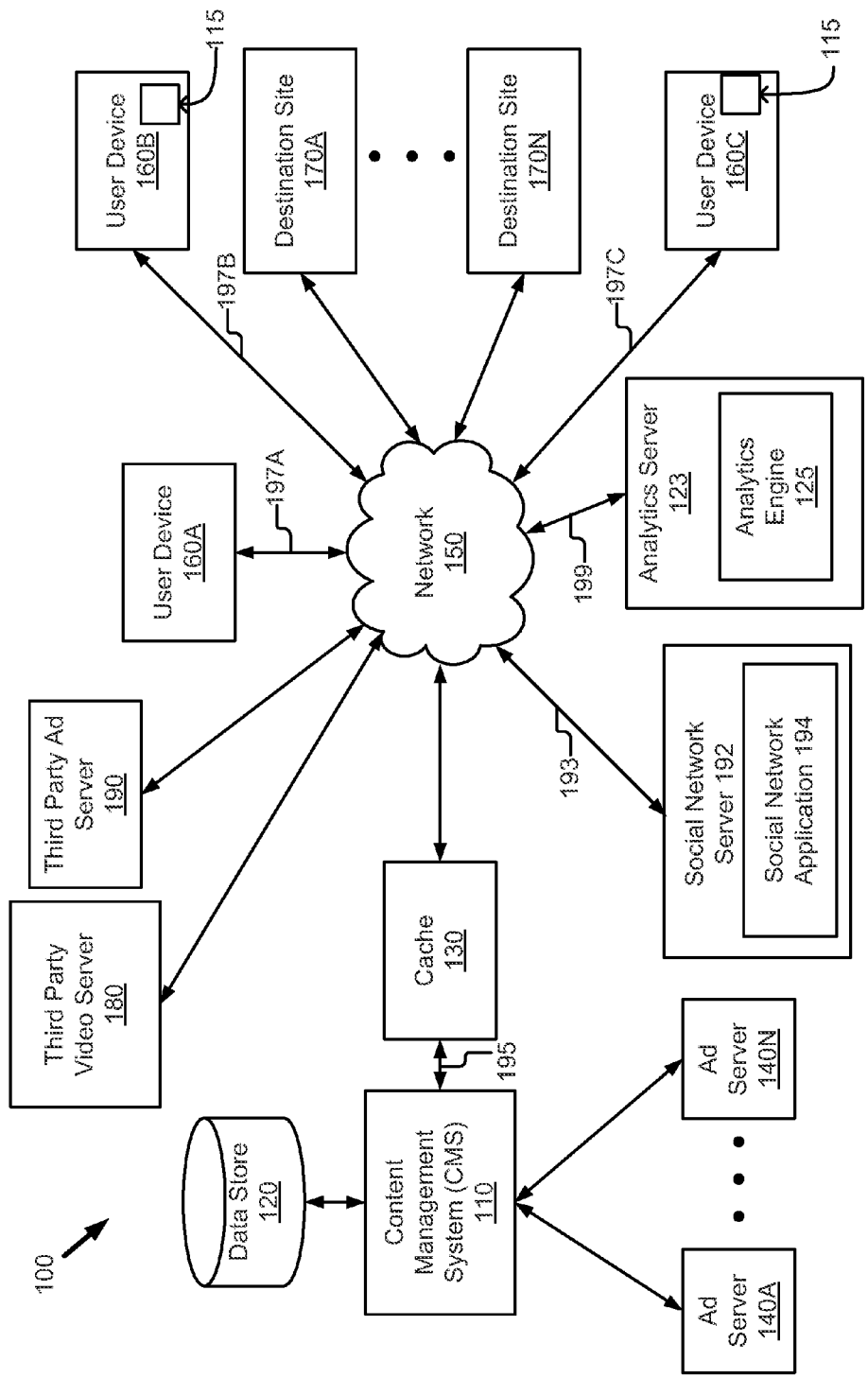
FIG. 1 is a high-level block diagram illustrating one embodiment of a computing environment for capturing custom events from a custom media player.

A system and method for providing web analytics for custom events generated by a custom media player is described below. In the following description, for purposes of explanation, numerous specific details are set forth to provide a thorough understanding of the various embodiments. However, it will be apparent to one skilled in the art that the various embodiments can be practiced without these specific details. In other instances, structures and devices are shown in block diagram form in order to avoid obscuring the certain details. For example, an embodiment is described below with reference to user interfaces and particular hardware. However, other embodiments can be described with reference to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present embodiments also relate to an apparatus for performing the operations herein. This apparatus may be specially constructed for the required purposes, or it may be a general-purpose computer selectively activated or reconfigured by a computer program stored in the computer. The embodiments disclosed may take the form of an entirely hardware embodiment, an entirely software embodiment or an embodiment including both hardware and software elements. One embodiment is implemented in software comprising instructions or data stored on a computer-readable storage medium, which includes but is not limited to firmware, resident software, microcode or another method for storing instructions for execution by a processor.

Furthermore, the embodiments may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card. Examples of optical disks include compact disk—read only memory (CD-ROM), compact disk—read/write (CD-R/W) and digital video disc (DVD).

Embodiments of the system described herein are suitable for storing and/or executing program code includes at least one processor coupled directly or indirectly to memory elements through a system bus. The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the algorithms and displays presented herein are not inherently related to any particular computer or other apparatus. Various general-purpose systems may be used with programs in accordance with the disclosure herein, or it may prove convenient to construct more specialized apparatus to perform the required method steps. The required structure for a variety of these systems will appear from the description below. It will be appreciated that a variety of programming languages may be used to implement the disclosure of the embodiments as described herein.

System Overview

FIG. 1 shows one embodiment of a system 100 for providing web analytics for custom events generated by a custom media player. In the embodiment depicted by FIG. 1, the system 100 includes a content management system (CMS) 110, a data store 120, an analytics server 123 that includes an analytics engine 125, a cache 130, one or more advertisement servers ("ad servers") 140A-140N (also referred to individually and collectively as 140), a network 150, a third party video server 180, a third party ad server 190, a social network server 192, one or more user devices 160A, 160B, 160C (also referred to individually and collectively as 160) and one or more destination sites 170A-170N (also referred to individually and collectively as 170). Additionally, FIG. 1 also illustrates one or more custom media players 115 operating on one or more user devices 160. However, in other embodiments, the system 100 includes different and/or additional components other than those depicted by FIG. 1.

The components of the system 100 are communicatively coupled to one another. For example, the analytics server 123 is communicatively coupled to the network 150 via signal line 199. The CMS 110 is communicatively coupled to the cache 130 via signal line 195. The user device 160A is communicatively coupled to the network 150 via signal line 197A. The user device 160B is communicatively coupled to the network 150 via signal line 197B. The user device 160C is communicatively coupled to the network 150 via signal line 197C. The social network server 192 is communicatively coupled to the network 150 via signal line 193.

The CMS 110 includes one or more processors and one or more storage devices storing data or instructions for execution by the one or more processors. For example, the CMS 110 is a server, a server array or any other computing device, or group of computing devices, having data processing and communication capabilities. The CMS 110 receives video data and metadata from one or more publishers operating on one or more user devices 160 or other sources. A publisher is a user that publishes a video on one or more of the CMS 110, the third party video server 180 and the destination site 170. For example, a publisher is an owner of a video. The CMS 110 associates the metadata with the video data and communicates the metadata, video data and association between video data and metadata to the data store 120, allowing the data store 120 to maintain relationships between video data and the metadata. Additionally, the CMS 110 receives search queries for stored video data from a user device 160 and retrieves video data and metadata associated with the stored video data from the data store 120.

The CMS 110 serves video data to the custom media player 115. The custom media player 115 is stored and executed by the user device 160. In one embodiment, the custom media player 115 includes code and routines stored on the user device 160. A processor of the user device 160 executes the media player 115. A browser (not pictured) stored and executed by the user device 160 receives video data from the CMS 110 via the network 150. The media player 115 receives the video data from the browser and displays a video on a display (not pictured) communicatively coupled to the user device 160. Optionally, the media player 115 includes extensible metadata that can be modified by a user to change the features of the media player 115. The media player 115 is described in more detail below.

Additionally, the CMS 110 includes data or instructions for generating one or more user interfaces displaying video data and metadata retrieved from the data store 120. The user interfaces generated by the CMS 110 simplify user review and modification of metadata associated with the video data, allowing publishers to customize presentation of the video data to other users via a destination site 170 and presentation of content along with the video data. For example, a user interface generated by the CMS 110 allows a publisher to customize the branding or skin of an embedded custom media player 115 used to present the video data when retrieved from a destination site 170 by modifying the metadata used by the CMS 110 to generate customized configuration data for the custom media player 115. As another example, a user interface generated by the CMS 110 allows a publisher to customize the temporal location and placement of supplemental content, such as an advertisement ("ad"), within video data when the video data is presented by a custom media player 115 operating on a user device 160. The CMS 110 is further described below in conjunction with FIGS. 3A and 3B.

The data store 120 is a non-volatile memory device or similar persistent storage device and media coupled to the CMS 110 for storing video data and metadata associated with stored video data. For example, the data store 120 and the CMS 110 exchange data with each other via the network 150. Alternatively, the data store 120 and the CMS 110 exchange data via a dedicated communication channel. While the embodiment shown by FIG. 1 depicts the data store 120 and CMS 110 as discrete components, in other embodiments a single component includes the data store 120 and the CMS 110.

In one embodiment, the data store 120 includes one or more tables associating metadata with video data. For example, the data store 120 includes a table where an entry in the table includes a field identifying the video data and additional fields include metadata associated with the video data. Additionally, the data store 120 may include additional tables identifying data used by a destination site 170 when storing video data for access by user devices 160. In one embodiment, the data store 120 includes data mapping metadata associated with video data to data used by a destination site 170. The mapping of metadata associated with video data to data used by a destination site 170 allows the data store 120 to automatically map metadata associated with video data with one or more data fields used by a destination site 170, which beneficially reduces the time for a destination site 170 to store and communicate video data from the data store 120 to a user device 160. In one embodiment, the data store 120 or the CMS 110 includes an index to expedite identification and/or retrieval of stored data from the data store 120.

The analytics server 123 is one or more devices having at least one processor coupled to at least one storage device including instructions for execution by the processor. For example, the analytics server 123 is one or more servers or other computing devices having data processing and data communication capabilities.

In one embodiment, the analytics server 123 tracks a website by receiving website usage data from a user device 160. The website usage data is data describing interaction between a web page and a user device 160. For example, the website usage data indicates that a browser in the user device 160 has loaded a web page for 5 minutes before switching to another web page. In one embodiment, the website usage data includes user interaction with a web page. For example, the website usage data includes data describing a user has clicked a link connected to a photo.

In another embodiment, the analytics server 123 receives requests from a custom media player 115 loaded in a user device 160. As described above, in one embodiment the media player 115 includes code and routines stored and executed by the user device 160. In another embodiment, the custom media player 115 is generated and transmitted to the user device 160 by the CMS 110. A request includes data describing a state, a change of a state of a custom media player 115 or an action taken by the custom media player 115. For example, a paused request indicates that the custom media player 115 has paused playing a video. The analytics server 123 analyzes the requests and generates video analytics data from the requests. For example, the analytics server 123 receives three paused requests from a custom media player 115 and determines that a user has paused viewing a video three times.

Video analytics data is data describing interaction among a video, a custom media player 115 and a user. For example, the video analytics data describes one or more of total views of a video, average views per day of a video, unique views (e.g., video views from a unique user) of a video, the number of advertisement impressions, the number of monetized views and the total watched minutes for a video, etc. The video analytics data is describing in more detail below with reference to FIG. 4.

In yet another embodiment, the analytics server 123 generates one or more reports describing website usage, video access and/or video access in conjunction with website usage using the website usage data and the video analytics data. For example, the analytics server 123 generates a report describing how video data is accessed whenever it is played back, regardless of the destination site 170 used to view the video data. In one embodiment, the analytics server 123 generates a report describing user interactions with one or more features customized by a publisher in a custom media player 115. The analytics server 123 and the analytics engine 125 are further described below with reference to FIG. 4.

The cache 130 is coupled to the content management system (CMS) 110 using the network 150 or using a direct communication channel between the CMS 110 and the cache 130. When a user device 160 or a destination site 170 retrieves video data from the data store 120, the CMS 110 communicates the video data to the cache 130, which stores a copy of the retrieved video data. Similarly, a query for video data from a user device 160 or a destination site 170 is initially transmitted via the network 150 to the cache 130 and the requested video data is communicated to the user device 160 or the destination site 170 by the cache 130 if a copy of the video data is stored by the cache 130. If the cache 130 does not include a copy of the requested video data, the query is communicated from the cache 130 to the CMS 110 to retrieve the video data. Hence, the cache 130 expedites retrieval of video data. While FIG. 1 illustrates a single cache 130, in other embodiments, the system 100 may include multiple caches 130.

The one or more advertisement servers ("ad servers") 140A-140N are one or more computing devices having a processor and a computer-readable storage medium storing advertisements and data for selecting advertisements. An ad server 140 communicates with the CMS 110 via the network 150 or via a communication channel with the CMS 110. Also, an ad server 140 communicates with destination sites 170, the analytics server 123, third party video servers 190 or user devices 160 via the network 150 to communicate advertisements for presentation when a web page is accessed. An ad server 140 also includes rules for targeting advertisements to specific users, for targeting advertisements to be displayed in conjunction with types of content, for targeting advertisements to specific locations or Internet Protocol (IP) addresses or other rules for selecting and/or targeting advertisements.

An ad server 140 receives metadata associated with video data from the CMS 110 and selects advertisements for presentation in conjunction with the video data based on the metadata. For example, the ad server 140 selects stored advertisements based on keywords associated with the video data. Thus, modification of the metadata associated with the video data using the CMS 110 enables modification of the advertisements presented in conjunction with the video data.

The network 150 is a conventional network and may have any number of configurations such as a star configuration, a token ring configuration or another configuration known to those skilled in the art. In various embodiments, the network 150 is a wireless network, a wired network or a combination of a wireless and a wired network. Furthermore, the network 150 may be a local area network (LAN), a wide area network (WAN) (e.g., the Internet) and/or any other interconnected data path across which multiple devices may communicate. In yet another embodiment, the network 150 may be a peer-to-peer network.

The network 150 may also be coupled to, or include, portions of a telecommunications network for communicating data using a variety of different communication protocols. In yet another embodiment, the network 150 includes a Bluetooth communication network and/or a cellular communications network for sending and receiving data. For example, the network 150 transmits and/or receives data using one or more communication protocols such as short messaging service (SMS), multimedia messaging service (MMS), hypertext transfer protocol (HTTP), direct data connection, WAP, email or another suitable communication protocol.

The one or more user devices 160A, 160B, 160C are computing devices having data processing and data communication capabilities. For example, a user device 160 comprises a desktop computer, a laptop computer, a netbook computer, a tablet computer or a smartphone. In one embodiment, different user devices 160A, 160B, 160C comprise different types of computing devices. For example, the user device 160A is a smartphone, the user device 160B is a tablet computer and the user device 160C is a laptop computer.

A user device 160 receives data from a user identifying a video (e.g., a title of the video, a video identification) and transmits the received data to a destination site 170 or to the CMS 110 via the network 150. The user device 160 then receives video data for the video through the network 150, allowing presentation of the video by the user device 160 to the user. For example, the video is presented on the custom media player 115. Similarly, the user device 160 receives metadata associated with video data from a user and transmits the metadata to the CMS 110 via the network 150 or receives metadata associated with video data from the CMS 110 from the network 150, allowing a user to view and/or modify the metadata using the user device 160.

In one embodiment, the user device 160 receives graphical data for depicting a user interface that allows a publisher to customize a custom media player 115 for presenting a video. For example, the user device 160 provides a user interface with one or more fields and drop-down boxes allowing a publisher to customize the temporal location and placement of an ad for a video.

The destination sites 170A-170N are computing devices having data processing and data communication capabilities, such as web servers. A destination site 170 includes data describing one or more web pages and communicates one or more web pages to a user device 160 via the network 150. One or more web pages stored by a destination site 170 include data or instructions for presenting video data by executing a custom media player 115 on the user device 160. In one embodiment, a destination site 170 retrieves video data and the custom media player 115 used to present the video data from the CMS 110, allowing the destination site 170 to present video data using the architecture of the CMS 110. Alternatively, a destination site 170 receives video data and configuration data for a custom media player 115 from the CMS 110 and embeds the video data and the configuration data into web pages to present video data. For example, a destination site 170 receives embed code describing operation of the custom media player 115 and identifying video data presented by the custom media player 115 and includes the embed code in a web page.

Thus, a user device 160 receives a web page from a destination site 170 to access content from the destination site 170 and communicates with the destination site 170 to navigate through a web page maintained by the destination site 170. One or more web pages stored by the destination site 170 include video data that is presented to the user by a custom media player 115.

The third party video server 180 is one or more devices having at least one processor coupled to at least one storage device including instructions for execution by the processor. For example, the third party video server 180 is a conventional server, a server array or any other computing device or group of computing devices, having data processing and communication capabilities. In one embodiment, the third party video server 180 receives video data and metadata from one or more publishers operating on one or more user devices 160 and provides videos described by the video data and metadata to one or more users. For example, the third party video server 180 publishes a video provided by an owner of the video on a web site and presents the video to a user operating on a user device 160 when a request to view the video is received from the user. The third party video server 180 is communicatively coupled to other components of the system 100 via the network 150.

The third party ad server 190 is any computing device having a processor and a computer-readable storage medium storing advertisements and data for selecting advertisements. For example, the third party server 190 selects an advertisement for a video and sends the advertisement to a user device 160 when the video is played by a media player 115 on the user device 160. The third party ad server 190 is communicatively coupled to other components of the system 100 via the network 150. In one embodiment, the third party ad server 190 provides functionalities similar to those provided by the ad server 140.

The social network server 192 is any computing device having a processor and a computer-readable storage medium storing data for providing a social network to users. Although only one social network server 192 is shown, persons of ordinary skill in the art will recognize that multiple servers may be present. A social network is any type of social structure where the users are connected by a common feature, for example, Orkut. The common feature includes friendship, family, work, an interest, etc. The common features are provided by one or more social networking systems, such as those included in the system 100, including explicitly-defined relationships and relationships implied by social connections with other users, where the relationships are defined in a social graph. The social graph is a mapping of all users in a social network and how they are related to each other.

In the depicted embodiment, the social network server 192 includes a social network application 194. The social network application 194 includes code and routines stored on a memory (not pictured) of the social network server 192 that, when executed by a processor (not pictured) of the social network server 192, causes the social network server 192 to provide a social network accessible by a user device 160 via the network 150. In one embodiment, a user publishes comments on the social network. For example, a user of the social network application 194 provides a status update and other users make comments on the status update. In another embodiment, a user that views a video on a custom media player 115 interacts with the social network via a social feature added to the custom media player 115. For example, a user clicks a social graphic such as a "share button" shown on the custom media player 115 to share the video with friends in the social network. The social feature and the social graphic are described in more detail below with reference to FIGS. 2-4.

User Device 160

Figure 2:
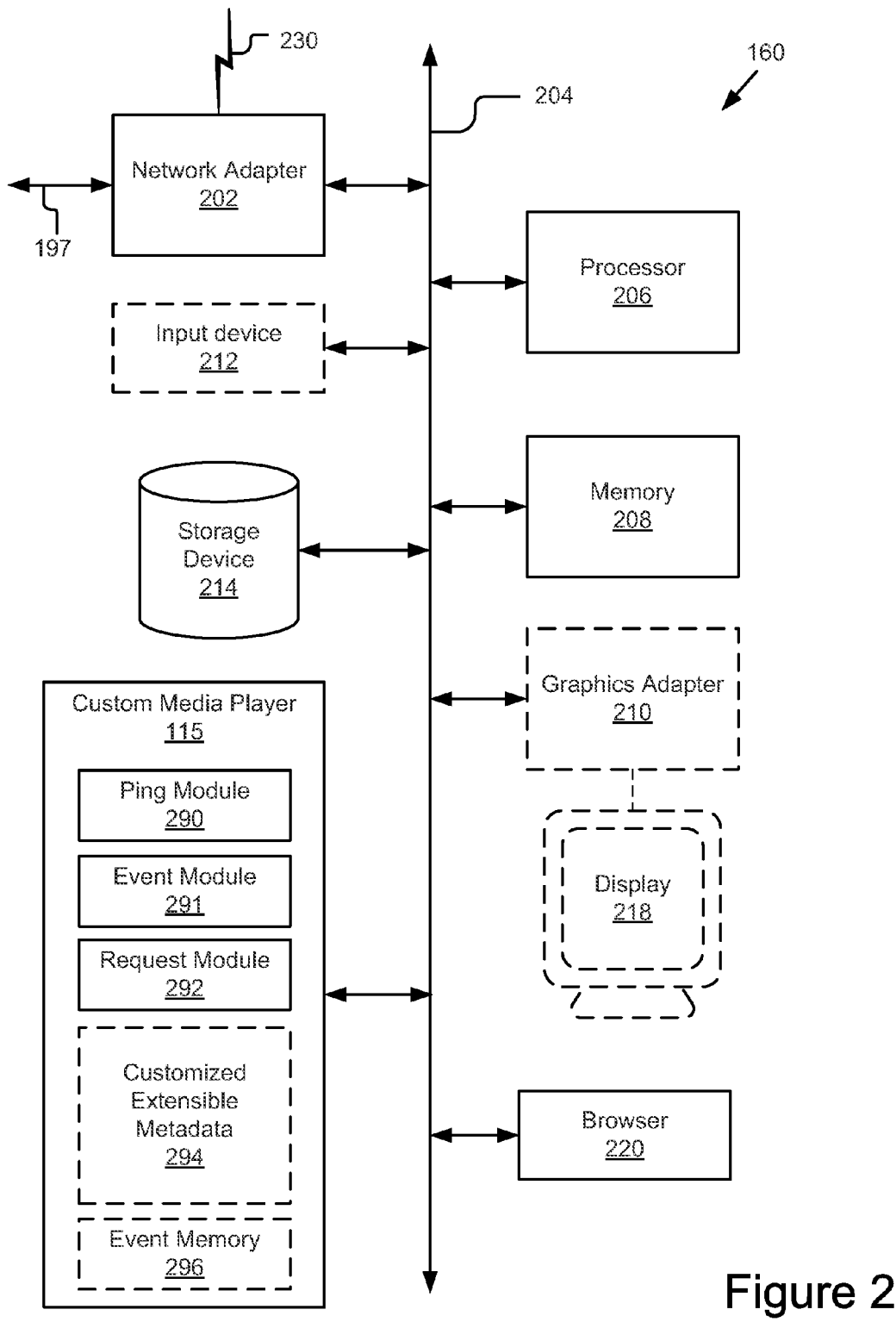
FIG. 2 is a block diagram illustrating one embodiment of a user device.

FIG. 2 is a block diagram illustrating one embodiment of a user device 160. As illustrated in FIG. 2, the user device 160 includes a network adapter 202 coupled to a bus 204. According to one embodiment, also coupled to the bus 204 are at least one processor 206, a memory 208, a graphics adapter 210, an input device 212, a storage device 214, a browser 220 and a custom media player 115. In one embodiment, the functionality of the bus 204 is provided by an interconnecting chipset. The user device 160 also includes a display 218, which is coupled to the graphics adapter 210. The input device 212, the graphics adapter 210 and the display 218 are depicted using dashed lines to indicate that they are optional features of the user device 160.

The network adapter 202 is an interface that couples the user device 160 to a local or wide area network. For example, the network adapter 202 is a network controller that couples the user device 160 to the network 150 via signal line 197 for data communication between the user device 160 and other components of the system 100. In one embodiment, the network adapter 202 is communicatively coupled to a wireless network (e.g., a wireless local area network) via a wireless channel 230.

The processor 206 may be any general-purpose processor. The processor 206 comprises an arithmetic logic unit, a microprocessor, a general purpose controller or some other processor array to perform computations and provide electronic display signals to the display 218. The processor 206 is coupled to the bus 204 for communication with other components of the user device 160. The processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The user device 160 also includes an operating system executable by the processor 206 such as, but not limited to, WINDOWS®, MacOS X, Android or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory such as a hard disk drive or flash drive for storing information on a more permanent basis. The memory 208 is coupled to the bus 204 for communication with the other components of the user device 160. In one embodiment, the custom media player 115 is stored in the memory 208 and executable by the processor 206.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for the processor 206 and comprises one or more devices including a hard disk drive, a floppy disk drive, a CD-ROM device, a DVD-ROM device, a DVD-RAM device, a DVD-RW device, a flash memory device, or some other mass storage device known in the art. For clarity, instructions and/or data stored by the storage device 214 are described herein as different functional "modules," where different modules are different instructions and/or data included in the storage device that cause the described functionality when executed by the processor 206.

The input device 212 may include a mouse, track ball, or other type of pointing device to input data into the user device 160. The input device 212 may also include a keyboard, such as a QWERTY keyboard. The input device 212 may also include a microphone, a web camera or similar audio or video capture device.

The graphics adapter 210 displays images and other information on the display 218. The display 218 is a conventional type such as a liquid crystal display (LCD) or any other similarly equipped display device, screen or monitor. The display 218 represents any device equipped to display electronic images and data as described herein.

The custom media player 115 includes code and routines for presenting video data to a user. For example, the custom media player 115 is a video player executed by a browser 220 to stream video data from one of the CMS 110, the destination site 170 and the third party video server 180 and present the video data to a user. In one embodiment, the custom media player 115 is included on one or more web pages provided by one of the destination site 170, the third party video server 180 and the CMS 110. For example, the user device 160 receives a web page from the destination site 170 and generates a custom media player 115 to present video data to the user according to an embed code in the web page. In another embodiment, the media player 115 includes code and routines stored in a memory of the user device 160 (e.g., one of memory 208 and storage device 214) and executed by the processor 206 to provide the functionality described herein.

In one embodiment, the custom media player 115 is a video player customized by a publisher. For example, the custom media player 115 is tailored by a publisher to include one or more customized features. Examples of a feature customized by a publisher include, but are not limited to, adding an age-gating function, adding a user login interface, generating a queue for playback, saving a video for viewing later, adding domain restrictions and/or geographic restrictions for viewing a video and requesting user's agreement to terms and conditions for viewing a video, etc. The domain restrictions to the custom media player 115 limit domains in which the custom media player 115 is able to present video data. The geographic restrictions limit geographic regions in which the custom media player 115 is able to present video data. For example, the domain restrictions and/or the geographic restrictions do not allow the custom media player 115 to play the video data outside the United States.

The custom media player 115 implements features customized by the publisher by taking actions caused by customization of the player. For example, the custom media player 115 implements an age-gating function by requesting a user to confirm that he/she is at least 18 years old. Examples of an action include, but are not limited to, determining whether a user is above a certain age, requesting a user to log in, generating a queue for the user, generating a "save" button for the user to save the video for viewing later, determining a location (e.g., an IP address) for a user device 160, applying domain restrictions and/or geographic restrictions, etc.

In the depicted embodiment, the custom media player 115 includes, among other things, a ping module 290, an event module 291, a request module 292, a set of customized extensible metadata 294 and an event memory 296. These components of the custom media player 115 are communicatively coupled to one another. The customized extensible metadata 294 and the event memory 296 are depicted with dashed lines to indicate that they are optional features for the custom media player 115.

The ping module 290 includes code and routines for handling communication between the custom media player 115 and other components of the system 100. For example, the ping module 290 receives a request from the request module 292 and sends the request to the analytics server 123. In one embodiment, the ping module 290 receives video data from one of the CMS 110, the third party video server 180 and the destination site 170. In another embodiment, the ping module 290 receives data stream for an advertisement from one of the ad server 140, the third party ad server 190 and the analytics server 123.

The event module 291 includes code and routines for detecting events and generating event data describing the events. An event describes a state of the custom media player 115 triggered by an action taken in the custom media player 115. For example, when the custom media player 115 is buffering video data for a video from the content management system 110, a video buffering event is captured by the event module 291 and event data describing the video buffering event is sent to the request module 292. In one embodiment, an event captured by the event module 291 is a custom event. A custom event is an event triggered by a customized feature of the custom media player 115. For example, if a publisher has added a user login function to the custom media player 115, the event module 291 generates event data describing a login event when the user is logging in. The event module 291 sends the event data to the request module 292.

In another example of a custom event, the publisher has added social features to the custom media player 115. For example, the custom media player 115 is decorated with one or more social graphics. A social graphic is a graphic configured to be clickable by the human user of the user device 160 to interact with a social network. For example, the social graphic is a "share button," a "favorite button" or any other button known in the art to allow a user to interact with a social network. These buttons are referred to as a "social button." The input provided by the user clicking a social button is referred to as a social input. Responsive to receiving a social input from the user by clicking the social graphic, the event module 291 generates event data describing one or more of the following events: sharing a video via email; sharing a video via an embed copy; sharing a video via a website; marking a video as a favorite video, etc. These events are referred to herein as "social events."

Other examples of a custom event include, but are not limited to, player loads, video views, viewing 25% of a video, viewing 50% of a video, viewing 75% of a video, viewing 100% of a video, automatic plays, manual plays, monetizable views, an ad being watched, an ad being clicked, an ad being abandoned, turning caption on or off for a video, switching a caption from one language to another language, adding an comment for a video, subscribing a video, dropping off a video, age-gating, user login, queue for playback, saving for later view and any other events triggered by a publisher's customization of the custom media player 115. Persons of ordinary skill in the art will recognize that the custom media player 115 may generate other custom events.

In one embodiment, a custom event includes video playback data and/or video data. The video playback data is one or more of an indication the custom media player 115 is loaded by the viewing device, an indication the custom media player 115 is playing the video data, an indication the custom media player 115 is displaying an advertisement, a percentage of the video data played by the custom media player 115, a length of time the custom media player 115 has played the video data, and an identifier of a referring web page that directed a viewer to the custom media player 115. The viewer engagement data comprises at least one of an indication of a viewer preference for the video data, an indication a viewer abandoned an advertisement being displayed by the custom media player 115, an indication a viewer interacted with an advertisement being displayed by the custom media player 115, an indication a viewer changed a volume level of the custom media player 115, an indication a viewer placed the custom media player 115 in full screen mode, an indication a viewer replayed a segment of the video data, an indication a viewer fast-forwarded the video data, an indication a viewer rewound the video data, an indication a viewer paused playing of the video data, an indication a viewer stopped playing of the video data, and a viewer instruction to share the video data. The event module 291 determines instances of events corresponding to the video playback data and/or video data, includes the video playback data and/or video data responsive to detecting instances of these events and includes the video playback data and/or video data in the custom event. The analytics engine 125 receives the custom event including the video playback data and/or video data and processes the custom event accordingly.

The request module 292 includes code and routines for generating a request. In one embodiment, the request module 292 generates a request based at least in part on event data received from the event module 291. For example, the request module 292 generates a login request if event data describing a user login event is received from the event module 291. A request includes one or more of a unique video identifier ("video ID") to identify a video, a video version identifier to indicate a version of the video (a video can have different versions; the video version identifier indicates which of these versions an event is related to, e.g., a second version of a video), a location identifier (e.g., a user device's 160 IP address) and an embedded Uniform Resource Locator ("URL") for a web page including the video. For example, a request includes a video ID and a video version identifier. In one embodiment, a request includes event data describing a custom event associated with a customized feature of the custom media player 115. For example, the request includes event data describing that a user has clicked a liked button shown on the custom media player 115. In another embodiment, a request includes event data describing an event that is not a custom event. For example, the request includes event data describing that the custom media player 115 failed to load the video. The request module 292 sends the generated request to the ping module 290 and the ping module 290 delivers the request to the analytics server 123.

Examples of a request include, but are not limited to the following: a load request indicating that the custom media player 115 is loaded on a web page; an ad start request indicating that an ad starts to play; an ad progress request reporting view progress of an ad at a predetermined interval (similar to the progress request described above, but relating to viewership of the advertisement instead of the video); an ad checkpoint request reporting view progress of an ad at a checkpoint (e.g., 25%, 50%, 75% and 100% of an ad's total length; similar to the checkpoint request described above, but relating to viewership of the advertisement instead of the video); an ad end request indicating that an ad has finished playing; a view request indicating that a video starts to play; a view progress request reporting view progress of a video at a predetermined interval; a view checkpoint request reporting view progress of a video at a checkpoint and a view end request reporting completion of playing a video, etc. These requests are described in more detail below with reference to FIGS. 6A-6C. Persons of ordinary skill in the art will recognize that the request module 292 may generate other requests not described above.

The customized extensible metadata 294 is extensible metadata used to customize the custom media player 115. The customized extensible metadata 294 includes configuration settings for the custom media player 115 to implement one or more features customized by the human user of the user device 160 or an administrator of one or more of the CMS 110, analytics server 123, third party video server 180 and third party ad server 190. For example, when the custom media player 115 is loaded by the user device 160, the custom media player 115 is configured according to the customized extensible metadata 294 so that the one or more customized features are added to the custom media player 115.

A configuration setting is configuration information describing how a custom media player 115 is configured. In one embodiment, the configuration setting describes a customized feature added to the custom media player 115. For example, a configuration setting describes that a social feature is added to the custom media player 115 so that the GUI for the custom media player 115 is decorated with one or more social buttons that the user can use to provide a social input, thereby interacting with a social network.

In one embodiment, the customized extensible metadata 294 is stored in the storage device 214 and retrieved by the custom media player 115 when the custom media player 115 is loaded. In another embodiment, the custom media player 115 receives the customized extensible metadata 294 from the player configuration module 338 and stores the customized extensible metadata 294 in the storage device 214.

In one embodiment, a publisher operating on a third party video server 180 interacts with the custom media player 115 via the network 150 to configure the customized extensible metadata 294 so that the custom media player 115 is configured with a customized feature such as a social feature. For example, the third party video server 180 operated by the publisher interacts with the player configuration module 338 via the network 150 to modify the customized extensible metadata 294 so that the custom media player 115 is configured to provide a customized feature. The player configuration module 338 is described below with reference to FIG. 3B.

The event memory 296 stores and buffers the event data transmitted from the event module 291. The event memory 296 may be a dynamic random access memory (DRAM) device, a static random access memory (SRAM) device, flash memory or some other memory device known in the art. In one embodiment, the memory 208 also stores requests generated by the request module 292 in conjunction with the event data.

The browser 220 includes code and routines stored in a memory 208 and executed by a processor 206 of a user device 160. For example, the browser 220 is a browser application such as Google Chrome™. In one embodiment, the browser 220 comprises a memory for storing data such as a cookie and/or the customized media player 115.

Content Management System (CMS) 110

Figure 3A:
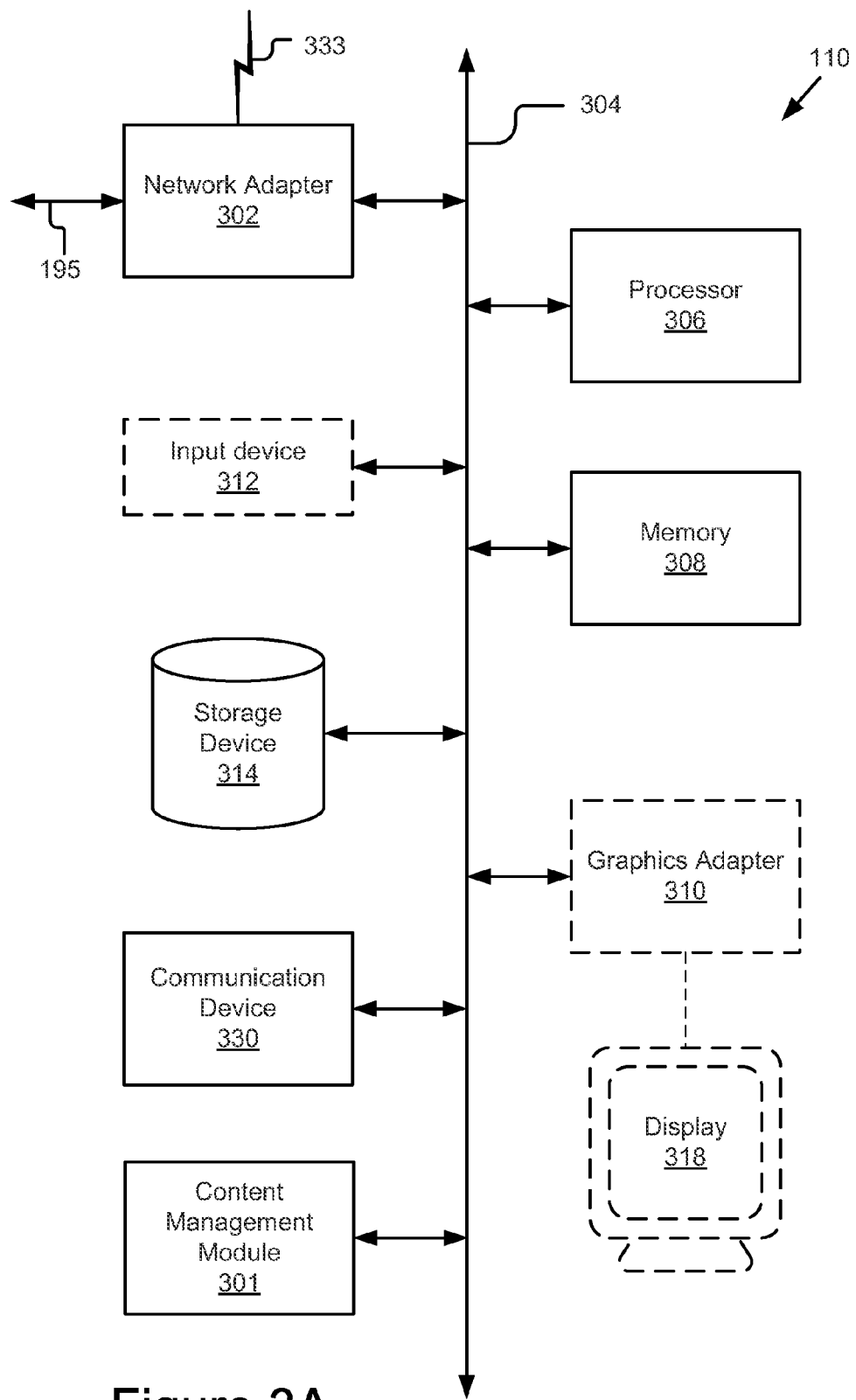
FIG. 3A is a block diagram illustrating one embodiment of a content management system.

FIG. 3A is a block diagram illustrating one embodiment of a CMS 110. As illustrated in FIG. 3A, the CMS 110 includes a network adapter 302 coupled to a bus 304. According to one embodiment, also coupled to the bus 304 are at least one processor 306, a memory 308, a graphics adapter 310, an input device 312, a storage device 314, and a communication device 330. In one embodiment, the functionality of the bus 304 is provided by an interconnecting chipset. The CMS 110 also includes a display 318, which is coupled to the graphics adapter 310. The input device 312, the graphics adapter 310 and the display 318 are depicted using dashed lines to indicate that they are optional features of the CMS 110.

The network adapter 302 is an interface that couples the CMS 110 to a local or wide area network. For example, the network adapter 302 is a network controller that couples to the network 150 via signal line 195 for data communication between the CMS 110 and other components of the system 100. In one embodiment, the network adapter 302 is communicatively coupled to a wireless network (e.g., a wireless local area network) via a wireless channel 331.

The processor 306 is any general-purpose processor. The processor 306 comprises an arithmetic logic unit, a microprocessor, a general purpose controller or some other processor array to perform computations, provide electronic display signals to the display 318. The processor 306 is coupled to the bus 304 for communication with the other components of the CMS 110. The processor 306 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3A, multiple processors may be included. The CMS 110 also includes an operating system executable by the processor 306 such as but not limited to WINDOWS®, MacOS X, Android, or UNIX® based operating systems.

The memory 308 holds instructions and data used by the processor 306. The instructions and/or data comprise code for performing any and/or all of the techniques described herein. The memory 308 may be a dynamic random access memory (DRAM) device, a static random access memory (SRAM) device, flash memory or some other memory device known in the art. In one embodiment, the memory 308 also includes a non-volatile memory such as a hard disk drive or flash drive for storing log information on a more permanent basis. The memory 308 is coupled by the bus 304 for communication with the other components of the CMS 110. In one embodiment, the content management module 301 is stored in memory 308 and executable by the processor 306.

The storage device 314 is any tangible device capable of storing data. The storage device 314 is a non-volatile memory device or similar permanent storage device and media. The storage device 314 stores data and instructions for the processor 306 and comprises one or more devices including a hard disk drive, a floppy disk drive, a CD-ROM device, a DVD-ROM device, a DVD-RAM device, a DVD-RW device, a flash memory device, or some other mass storage device known in the art. In some embodiments, the storage device 314 includes instructions and/or data for maintaining metadata associated with video data, for modifying stored metadata or for retrieving stored video data or stored metadata associated with stored video data. For clarity, instructions and/or data stored by the storage device 314 are described herein as different functional "modules," where different modules are different instructions and/or data included in the storage device that cause the described functionality when executed by the processor 306.

The input device 312 may include a mouse, track ball, or other type of pointing device to input data into the CMS 110. The input device 312 may also include a keyboard, such as a QWERTY keyboard. The input device 312 may also include a microphone, a web camera or similar audio or video capture device. The graphics adapter 310 displays images and other information on the display 318. The display 318 is a conventional type such as a liquid crystal display (LCD) or any other similarly equipped display device, screen, or monitor. The display 318 represents any device equipped to display electronic images and data as described herein.

The communication device 330 transmits data from the CMS 110 to the network 150 and receives data from the network 150. The communication device 330 is coupled to the bus 304. In one embodiment, the communication device 330 also exchanges data with one or more of the analytics server 123, the data store 120, the cache 130, the third party video server 180, the third party ad server 190 and/or one or more ad servers 140 using communication channels other than the network 150. In one embodiment, the communication device 330 includes a port for direct physical connection to the network 150 or to another communication channel. For example, the communication device 330 includes a USB, SD, CAT-5 or similar port for wired communication with the network 150. In another embodiment, the communication device 330 includes a wireless transceiver for exchanging data with the network 150, or with another communication channel, using one or more wireless communication methods, such as IEEE 802.11, IEEE 802.16, BLUETOOTH® or another suitable wireless communication method.

In yet another embodiment, the communication device 330 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 330 includes a wired port and a wireless transceiver. The communication device 330 also provides other conventional connections to the network 150 for distribution of files and/or media objects using standard network protocols such as TCP/IP, HTTP, HTTPS and SMTP as will be understood to those skilled in the art.

FIG. 3A further illustrates a content management module 301 communicating over bus 304 with the other components of the CMS 110. The content management module 301 provides logic and instructions for storing video data from a publisher and providing the video data to other users. In one embodiment, the content management module 301 can be implemented in hardware (e.g., in an FPGA), as illustrated in FIG. 3A. In another embodiment, the content management module 301 can include software routines and instructions that are stored, for example, in the memory 308 and/or storage device 314 and executable by the processor 306 to cause the processor to store video data from a publisher and provide the video data to other users. Details describing the functionality and components of the content management module 301 will be explained in further detail below with reference to FIG. 3B.

As is known in the art, the CMS 110 can have different and/or other components than those shown in FIG. 3A. In addition, the CMS 110 can lack certain illustrated components. In one embodiment, the CMS 110 lacks an input device 312, graphics adapter 310, and/or display 318. Moreover, the storage device 314 can be local and/or remote from the CMS 110 (such as embodied within a storage area network (SAN)).

As is known in the art, the CMS 110 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 314, loaded into the memory 308, and executed by the processor 306.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Content Management Module 301

Figure 3B:
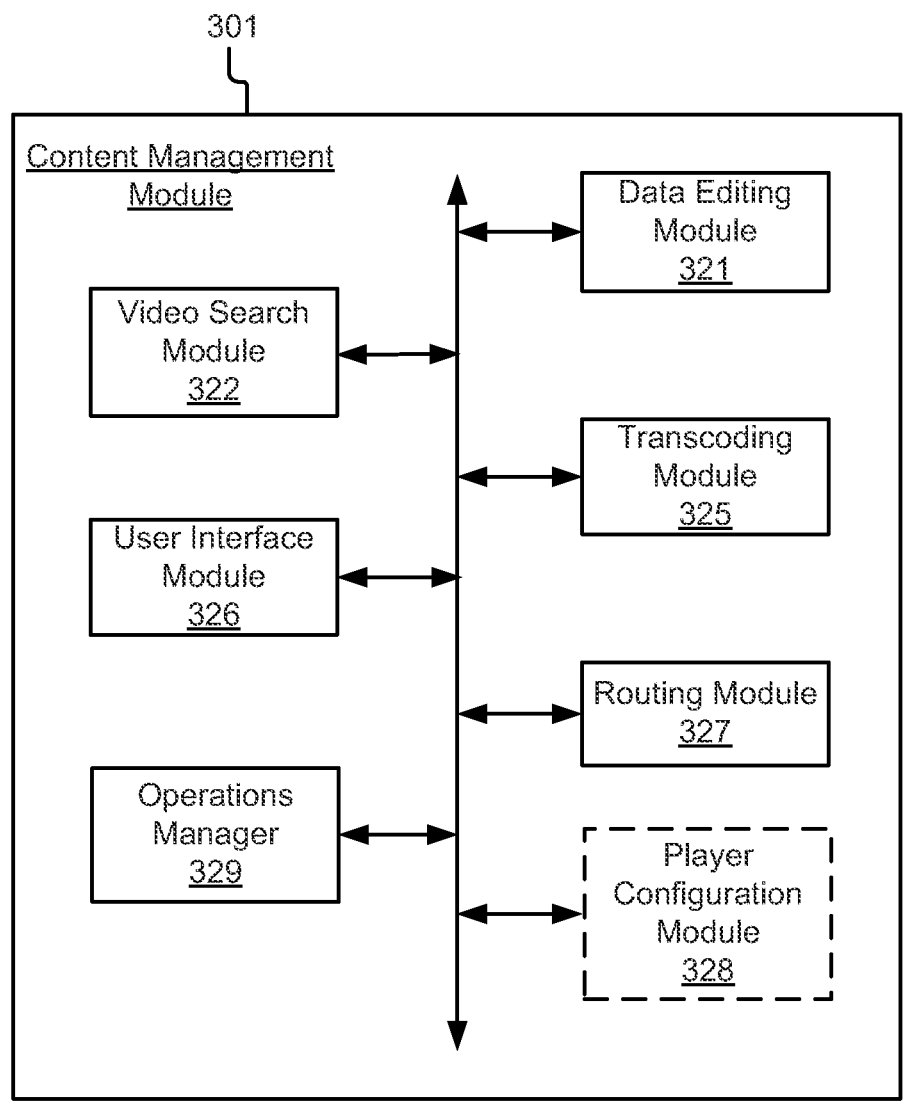
FIG. 3B is a block diagram illustrating one embodiment of a content management module.

Turning now to the content management module 301, FIG. 3B is a block diagram illustrating one embodiment of the content management module 301. In the embodiment depicted by FIG. 3B, the content management module 301 includes a data editing module 321, a video search module 322, a transcoding module 325, a user interface module 326, a routing module 327, a player configuration module 328 and an operations manager 329. In other embodiments, the content management module 301 includes different and/or additional modules than the ones depicted in FIG. 3B.

In one embodiment, the modules are implemented using instructions and/or data included in the storage device 314. In another embodiment, the modules are implemented using one or more hardware devices configured to provide the functionality further described below. For example, the modules are implemented using one or more application specific integrated circuits (ASICs) and/or one or more FPGAs coupled to the bus 304 and configured to provide the functionality of the modules further described below.

The data editing module 321 is software and routines executable by the processor 306 for modifying metadata and/or video data stored in the data store 120. In one embodiment, the data editing module 321 receives data from a user of the user device 160 via the user interface module 326. The data editing module 321 uses the received data to generate (or modify) metadata that is stored by the data store 120. Additionally, the data editing module 321 generates or modifies playlists including a sequence of video data based on data received from a user device 160 via the user interface module 326. For example, the user interface module 326 receives data for modifying stored metadata associated with video data (or data identifying metadata for association with video data) from a user device 160 via the network 150 and the bus 304. The data editing module 321 modifies the metadata associated with the video data using the received data. In one embodiment, the data editing module 321 stores the received metadata and an association between the received metadata and video data in the data store 120 as described in further detail below.

In one embodiment, the data editing module 321 generates an instruction identifying the metadata to be modified and describing the modification to the metadata. In another embodiment, the data editing module 321 generates an instruction identifying metadata and video data associated with the metadata. The generated instruction is then transmitted to the data store 120 by the communication device 330 to modify the metadata. Similarly, the data editing module 321 generates an instruction modifying a playlist, identifying modifications to the video data included in the playlist or identifying one or more attributes associated with the playlist to be modified. The generated instruction is transmitted to the data store 120 via the bus 304, the communication device 330 and the network 150.

The video search module 322 is software and routines executable by the processor 306 for generating data or instructions for retrieving video data from the data store 120 based on received input, such as search terms. The video search module 322 searches the data store 120 for metadata that match or are similar to search terms received from the communication device 330 and/or from the user interface module 326. Hence, the video search module 322 allows users to more easily retrieve stored video data using metadata associated with the stored video data. For example, the video search module 322 accesses the data store 120 via the network 150, the communication device 330 and the bus 304 to identify video data associated with metadata that match or are similar to search terms received from the communication device 330 and/or from the user interface module 326.

Rather than require navigation through a directory structure to retrieve stored video data, like conventional data retrieval, the video search module 322 searches metadata associated with stored video data to identify and retrieve stored video data. In one embodiment, the video search module 322 also receives data limiting the metadata to which the search terms are compared. For example, the video search module 322 receives input limiting comparison of search terms to metadata specifying video title and not to other metadata. The video search module 322 also receives data from the data store 120 describing stored video data associated with metadata that match or are similar to the search terms. The video search module 322 communicates the description of the stored video data to the user interface module 326 via the bus 304, and the user interface module 326 generates a user interface presenting the video data from the data store 120 to a user.

The transcoding module 325 is software and routines executable by the processor 306 for generating a copy of the video data encoded in a different format than the video data's original format. The transcoding module 325 includes one or more codecs for generating differently encoded copies of the video data. For example, the transcoding module 325 includes multiple video codecs, such as H.262/MPEG-2 Part 2 codecs, H.264/MPEG-4 Advanced Video Coding codecs, MPEG-4 Part 2 codecs, VP8 codecs or other video codecs. By storing different video codecs, the transcoding module 325 enables generation of a compressed version of stored video data by encoding the video data with one or more of the stored video codecs. The differently-encoded copy of the video data is communicated to the data store 120 for storage and association with the original video data.

In one embodiment, the transcoding module 325 automatically encodes video data received by the CMS 110 using one or more predetermined codecs to generate one or more compressed versions of the video data, which are stored in the data store 120 along with the original video data. For example, the transcoding module 325 automatically encodes video data using one or more commonly-used codecs, such as one or more H.264/MPEG-4 Advanced Video Coding codecs or one or more VP8 codecs. This simplifies distribution of the video data to destination sites 170 by automatically generating compressed versions of the video data using codecs most commonly used by destination sites 170. In one embodiment, input received by the user interface module 326 allows a user to specify one or more codecs that are automatically applied to video data. For example, a user specifies a list of codecs to produce compressed video data compatible with user-desired destination sites 170, allowing the CMS 110 to automatically generate video data compatible with the user-desired destination sites 170.

The transcoding module 325 may also receive input via the user interface module 326, allowing manual identification of a codec and encode video data using the identified codec. Additionally, a user may communicate one or more codecs to the CMS 110 via the network 150 and the transcoding module 325 stores the user-supplied codecs for subsequent use. Additionally, destination sites 170 may communicate codecs to the transcoding module 325 via the network 150, allowing the transcoding module 325 to dynamically modify the codecs used. The transcoding module 325 may also modify the one or more codecs automatically applied to video data responsive to data from destination sites 170 and/or from user devices 160, enabling dynamic modification of video encoding as different and/or additional codecs become more commonly used.

The user interface module 326 is software and routines executable by the processor 306 for generating graphical data to provide one or more user interfaces for receiving data from a user and/or presenting video data and/or metadata associated with video data to a user. For example, the user interface module 326 includes instructions that, when executed by a processor 306, generate user interfaces for displaying metadata associated with video data and/or modifying metadata associated with video data. In one embodiment, data stored in the user interface module 326 is communicated to a user device 160 via the communication device 330 and the network 150, and a processor included in the user device 160 generates a user interface by executing the instructions provided by the user interface module 326.

In one embodiment, the user interface module 326 generates graphical data for providing a user interface to display metadata that is associated with video data and stored in the data store 120 and receive modification to the stored metadata. In another embodiment, the user interface module 326 generates graphical data for providing a user interface identifying stored video data associated with a user from the data store 120, expediting the user's review of previously stored video data. In yet another embodiment, the user interface module 326 generates graphical data for providing a user interface for receiving user input to upload video data from a user device 160 to the data store 120 and facilitating publication of the video data using the content management system 110. In yet another embodiment, the user interface module 326 generates graphical data for providing a user interface allowing a publisher to customize a custom media player 115. For example, the inputs provided by the publisher cause the customized extensible metadata 294 to be modified as described above.

The routing module 327 is software and routines executable by the processor 306 for identifying a destination for data received by the CMS 110 or processed by the CMS 110. After the routing module 327 determines the destination, the communication device 330 transmits the data to the determined destination using the bus 304. In one embodiment, the routing module 327 includes a routing table associating destinations with different types of data and/or with different commands.

For example, the routing module 327 determines that editing commands from the data editing module 321 are routed to the data store 120 and determines that search commands from the video search module 322 are routed to the data store 120. As additional examples, the routing module 327 determines that data from the user interface module 326 is directed to a user device 160 or determines that website usage data or video access data is transmitted to the analytics server 123.

The player configuration module 328 includes software and routines executable by the processor 306 for generating configuration settings for the custom media player 115. In one embodiment, the player configuration module 328 generates a configuration setting based at least in part on inputs from a publisher operating on a computing device such as one of the third party video server 180 and the user device 160A. For example, the player configuration module 328 generates a configuration setting based on any customized function (e.g., social feature, age gating, user login, generating queue for playback, saving a video for later view, etc.) added to the custom media player 115 by the publisher. In one embodiment, the customized functions are added to the custom media player 115 by modifying the customized extensible metadata 294 for the custom media player 115. The player configuration module 328 is depicted using a dashed line to indicate that it is an optional feature of the content management module 301. In one embodiment, the player configuration module 328 is comprised within one or more of the third party video server 180, the content management module 301 and the destination site 170.

In one embodiment, a publisher uploads a video to the content management system 110 and/or customizes a custom media player 115 for the video via the player configuration module 328. For example, a publisher adds one or more features to the custom media player 115 by submitting data describing a customization for the custom media player 115 to the player configuration module 328 via a user interface and the player configuration module 328 converts the data describing the customization from the publisher into a configuration setting.

Data describing a customization includes, for example, data describing one or more of a social feature, age gating, ad tailoring queries, adding domain restrictions, adding geographic restrictions, etc. The player configuration module 328 stores the configuration setting as a portion of the customized extensible metadata 294 in the storage device 314. For example, the player configuration module 328 stores a blacklist in the customized extensible metadata 294 for identifying domains or geographic regions in which the custom media player 115 is unable to present video data. Alternatively, the player configuration module 328 stores a whitelist in the customized extensible metadata 294 for identifying domains or geographic regions in which the custom media player 115 is able to present video data. In other embodiments, the player configuration module 328 includes both a whitelist and a blacklist of domains or geographic regions in the customized extensible metadata 294 for limiting presentation of video data by the custom media player 115.

In one embodiment, the player configuration module 328 sends the customized extensible metadata 294 to a user device 160 and the custom media player 115 executing on the user device 160 is configured according to the customized extensible metadata 294 to provide one or more customized features added by the publisher. In another embodiment, the player configuration module 328 stores the customized extensible metadata 294 in the storage device 314 or the data store 120.

The operations manager 329 is software and routines executable by the processor 306 for generating modifications to metadata stored in the data store 120 and scheduling modification of the stored metadata. Additionally, the operations manager 329 determines when data stored by the data store 120 is changed and notifies the CMS 110 when stored data has been changed using the communication device 330 and/or the network 150 or any other connection to the data store 120. In one embodiment, the operations manager 329 maintains one or more queues for scheduling modification of stored metadata or communicating new metadata to the data store 120. The operations manager 329 also communicates changes of stored metadata to one or more destination sites 170 via the communication device 330 and the network 150, allowing a destination site 170 to receive the most current metadata. In one embodiment, the operations manager 329 generates a queue or other schedule specifying the timing of communication of metadata to one or more destination sites 170.

Analytics Server 123

Figure 4:
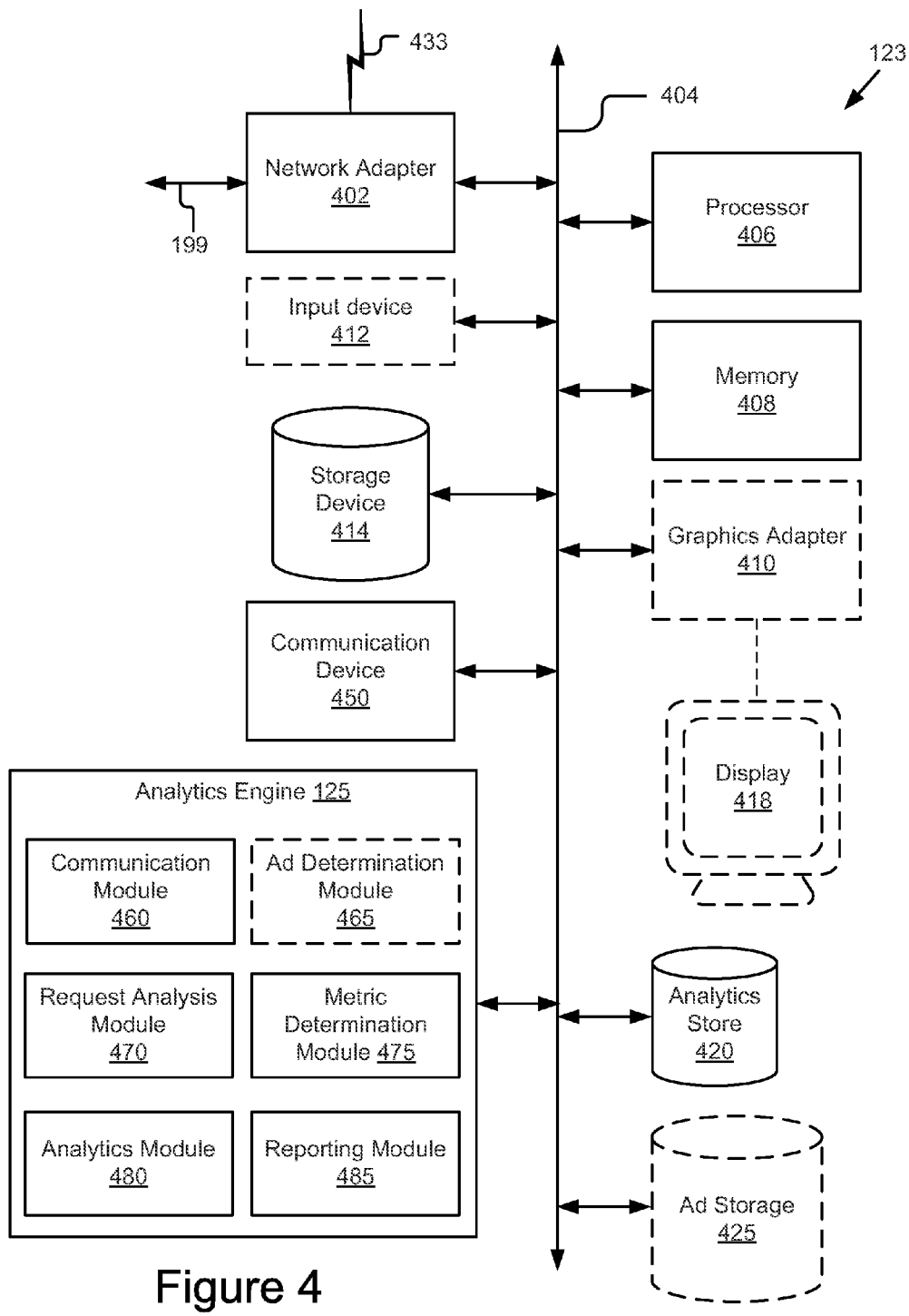
FIG. 4 is a block diagram illustrating one embodiment of an analytics server.

Referring now to FIG. 4, the analytics server 123 and analytics engine 125 are shown in more detail. As illustrated in FIG. 4, the analytics server 123 includes a network adapter 402 coupled to a bus 404. According to one embodiment, also coupled to the bus 404 are at least one processor 406, a memory 408, a graphics adapter 410, an input device 412, a storage device 414, an analytics engine 125, an analytics store 420, an advertisement storage ("ad storage") 425 and a communication device 450. In one embodiment, the functionality of the bus 404 is provided by an interconnecting chipset. The analytics server 123 also includes a display 418, which is coupled to the graphics adapter 410. The input device 412, the graphics adapter 410 and the display 418 are depicted using dashed lines to indicate that they are optional features of the analytics server 123. Persons of ordinary skill in the art will recognize that the analytics server 123 can have different and/or other components than those shown in FIG. 4. In addition, the storage device 414 can be local and/or remote from the analytics server 123 (such as embodied within a storage area network (SAN)).

As is known in the art, the analytics server 123 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device, loaded into the memory, and executed by the processor 406.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The network adapter 402 is an interface that couples the analytics server 123 to a local or wide area network. For example, the network adapter 402 is a network controller that couples to the network 150 via signal line 199 for data communication between the analytics server 123 and other components of the system 100. In one embodiment, the network adapter 402 is communicatively coupled to a wireless network (e.g., a wireless local area network) via a wireless channel 433.

The processor 406 is any general-purpose processor. The processor 406 comprises an arithmetic logic unit, a microprocessor, a general purpose controller or some other processor array to perform computations, provide electronic display signals to the display 418. The processor 406 is coupled to the bus 404 for communication with the other components of the analytics server 123. The processor 406 processes data signals and may comprise various computing architectures including a complex instruction set computer (CISC) architecture, a reduced instruction set computer (RISC) architecture, or an architecture implementing a combination of instruction sets. Although only a single processor is shown in FIG. 4, multiple processors may be included. The analytics server 123 also includes an operating system executable by the processor 406 such as but not limited to WINDOWS®, MacOS X, Android, or UNIX® based operating systems.

The memory 408 holds instructions and data used by the processor 406. The instructions and/or data comprise code for performing any and/or all of the techniques described herein. The memory 408 may be a dynamic random access memory (DRAM) device, a static random access memory (SRAM) device, flash memory or some other memory device known in the art. In one embodiment, the memory 408 also includes a non-volatile memory such as a hard disk drive or flash drive for storing log information on a more permanent basis. The memory 408 is coupled by the bus 404 for communication with the other components of the analytics server 123. In one embodiment, the analytics engine 125 is stored in the memory 408 and executable by the processor 346.

The storage device 414 is any device capable of holding data, like a hard drive, compact disk read-only memory (CD-ROM), DVD, or a solid-state memory device. The storage device 414 is a non-volatile memory device or similar permanent storage device and media. The storage device 414 stores data and instructions for the processor 408 and comprises one or more devices including a hard disk drive, a floppy disk drive, a CD-ROM device, a DVD-ROM device, a DVD-RAM device, a DVD-RW device, a flash memory device, or some other mass storage device known in the art. In some embodiments, the storage device 414 includes instructions and/or data for maintaining metadata associated with video data, for modifying stored metadata or for retrieving stored video data or stored metadata associated with stored video data. For clarity, instructions and/or data stored by the storage device 414 are described herein as different functional "modules," where different modules are different instructions and/or data included in the storage device that cause the described functionality when executed by the processor 406.

The input device 412 may include a mouse, track ball, or other type of pointing device to input data into the analytics server 123. The input device 412 may also include a keyboard, such as a QWERTY keyboard. The input device 412 may also include a microphone, a web camera or similar audio or video capture device. The graphics adapter 410 displays images and other information on the display 418. The display 418 is a conventional type such as a liquid crystal display (LCD) or any other similarly equipped display device, screen, or monitor. The display 418 represents any device equipped to display electronic images and data as described herein.

The communication device 450 transmits data from the analytics server 123 to the network 150 and receives data from the network 150. The communication device 450 is coupled to the bus 404. In one embodiment, the communication device 450 also exchanges data with one or more of the CMS 110, the data store 120, the cache 130 and/or one or more ad servers 140 using communication channels other than the network 150. In one embodiment, the communication device 450 includes a port for direct physical connection to the network 150 or to another communication channel. For example, the communication device 450 includes a USB, SD, CAT-5 or similar port for wired communication with the network 150. In another embodiment, the communication device 450 includes a wireless transceiver for exchanging data with the network 150, or with another communication channel, using one or more wireless communication methods, such as IEEE 802.11, IEEE 802.16, BLUETOOTH® or another suitable wireless communication method.

In yet another embodiment, the communication device 450 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 450 includes a wired port and a wireless transceiver. The communication device 450 also provides other conventional connections to the network 150 for distribution of files and/or media objects using standard network protocols such as TCP/IP, HTTP, HTTPS and SMTP as will be understood to those skilled in the art.

The analytics engine 125 includes code and routines executable by the processor 406 for analyzing website usage data and requests received from the custom media player 115. The analytics engine 125 is communicatively coupled to the bus 404 for communication with other components of the analytics server 123. In one embodiment, the analytics engine 125 provides logic and instructions for performing one or more of the following functions: receiving website usage data; receiving requests from the custom media player 115; determining metrics for custom events; generating video analytics data from requests; and storing one or more of the custom events, the metrics, the video analytics data and the website usage data in the analytics store 420, etc.

In one embodiment, the analytics engine 125 is implemented in hardware (e.g., in an FPGA) as illustrated in FIG. 4. In another embodiment, the analytics engine 125 includes software routines and instructions that are stored, for example, in the memory 408 and/or storage device 414 and executable by the processor 406 to cause the processor 406 to implement functionalities described herein.

In the depicted embodiment as shown in FIG. 4, the analytics engine 125 includes a communication module 460, an advertisement determination module ("ad determination module") 465, a request analysis module 470, a metric determination module 475, an analytics module 480 and a reporting module 485. These components of the analytics engine 125 are communicatively coupled to one another. The ad determination module 465 is depicted using a dashed line to indicate that it is an optional feature of the analytics engine 125.

The communication module 460 includes code and routines for handling communication between the analytics engine 125 and other components of the system 100. In one embodiment, the communication module 460 receives requests that include event data from the custom media player 115 via the network 150 and the communication device 450. In another embodiment, the communication module 460 sends a report generated by the reporting module 485 to a user. In yet another embodiment, the communication module 460 sends data stream for an ad to the custom media player 115 launched in a user device 160.

The ad determination module 465 includes code and routines for determining an ad to be played on the custom media player 115. For example, the ad determination module 465 parses metadata associated with a video (e.g., a keyword describing the video) and selects an ad that matches the metadata of the video from the ad storage 425. In one embodiment, the ad determination module 465 implements one or more of the functionalities provided by the ad server 140 and the third party ad server 190. In one embodiment, an ad associated with a video is pre-determined by a publisher (e.g., an administrator of the third party video server 180) when publishing the video and the ad determination module 465 retrieves the pre-determined ad for the video from the ad storage 425 using the video ID.

In one embodiment, the ad determination module 465 retrieves analytics data for a video from the analytics store 420 and determines an ad for the video based at least in part on the analytics data. For example, if the analytics data shows that 60% of the referrers of the video are geographically located in Asia, the ad determination module 465 selects an ad related to a product that is popular in Asia (e.g., a book that teaches how to cook Chinese food).

In yet another embodiment, the ad determination module 465 determines when to play the ad during the viewing process of the video. For example, the ad determination module 465 determines whether to play the ad before playing the video (e.g., a pre-roll ad), in the middle of playing the video (e.g., a mid-roll ad) or after playing the video (e.g., a post roll ad).

The request analysis module 470 includes code and routines for analyzing a request. The request analysis module 470 receives the request from the custom media player 115 via the communication module 460. For example, the request analysis module 470 is a parser parsing a request received from the custom media player 115 to retrieve one or more of a video ID, a video version, a URL to view a video and event data describing an event. In one embodiment, the request analysis module 470 stores the video ID, the video version, the URL and the event data in the analytics store 420.

The request analysis module 470 determines whether the event data included in the request describes a custom event. For example, the request analysis module 470 determines whether the event data describes an event associated with a customized feature of the custom media player 115. In one embodiment, the request analysis module 470 maintains a first list of custom events and determines an event to be a custom event if the event described by the event data is included in the first list. In another embodiment, the request analysis module 470 maintains a second list of non-custom events and determines an event to be a custom event if the event described by the event data is not included in the second list.

In one embodiment, the event data includes one or more bits of data indicating that the event data describes a custom event. This bit is referred to as a custom event indicator bit. The request analysis module 470 parses the event data for the custom event indicator bit and, responsive to detecting the presence of the custom event indicator bit, determines that the event data describes a custom event.

The request analysis module 470 sends the event data describing a custom event to the metric determination module 475. In one embodiment, the request analysis module 470 stores the event data describing the custom event as a portion of event data 520 in the analytics store 420.

The metric determination module 475 includes code and routines for determining a metric for event data describing a custom event. For example, the metric determination module 475 receives event data describing a user saving a video for later view and determines a "saving for later view" metric for the custom event. The metric determination module 475 stores the metric in the metric categories 515 of the analytics store 420. The metric categories 515 are described below with reference to FIG. 5.

A metric is a statistical category that quantifies a custom event for a video. For example, the metric describes how many times a user provided one or more inputs to: share a video; favorite a video; respond to an age-gating dialog; provide user login information responsive to a user login dialog; generate a queue for playback, saving for later view; and trigger any other custom events.

In one embodiment, a metric quantifies the performance of video content. For example, a metric is a category describing one or more of the following: player loads; video views; viewing 25% of a video; viewing 50% of a video; viewing 75% of a video; viewing 100% of a video; automatic plays; manual plays; monetizable views; an ad being watched; an ad being clicked; turning caption on or off for a video; switching a caption from one language to another language; adding an comment for a video; subscribing a video; dropping off a video, etc.

The metric determination module 475 determines whether the metric for the event data is a new metric. For example, the metric determination module 475 maintains a list of metrics for custom events and determines the metric as a new metric if the metric is not in the list. The metric determination module 475 adds the new metric to the list and stores the list in the analytics store 420.

The analytics module 480 includes code and routines for analyzing event data describing custom events and generating video analytics data from the event data. In one embodiment, the analytics module 480 retrieves event data associated with a video and metrics for the event data from the analytics store 420. The analytics module 480 calculates values for the metrics using the event data and stores the values for the metrics as video analytics data in the analytics data 525. The analytics data 525 is described below with reference to FIG. 5.

For example, the analytics module 480 analyzes event data describing custom events related to a feature customized by a publisher (e.g., one or more social features) and calculates values for metrics associated with the feature (e.g., the number of times a video is shared, favorite, etc.) The analytics module 480 stores the values for the metrics as video analytics data in the analytics data 525. It is particularly beneficial to obtain the video analytics data because, among other things, the video analytics data describes user interactions with the customized feature and facilitates performance evaluation of the customization of the custom media player 115 for the publisher. In one embodiment, the analytics module 480 sends the video analytics data to the reporting module 485.

In one embodiment, the analytics module 480 analyzes event data describing custom events and website usage data from a website including an embedded version of the custom media player 115 to obtain associations between a customized feature of the custom media player 115 and web page interactions. For example, the analytics module 480 analyzes the website usage data for a web page including a custom media player 115 with a customized feature of "generating a queue for playback" and generates an analysis result. Next, the analytics module 480 analyzes the website usage data for the web page including the custom media player 115 without the customized feature and generates another analysis result. The analytics module 480 compares the two analysis results and concludes that the customized feature of the custom media player 115 promotes 10% increment of user visits to the web page.

In another embodiment, the analytics module 480 determines geographic information related to the event data. For example, the analytics module 480 determines one or more geographic locations in which the users view the video. The analytics module 480 stores the geographic information in the analytics store 420.

The reporting module 485 includes code and routines for generating a report to a user. In one embodiment, the reporting module 485 retrieves event data describing custom events from the analytics store 420 and generates a report based at least in part on the event data. The report includes video analytics data and other analytics results generated by the analytics module 480. In one embodiment, the reporting module 485 includes data describing one or more predefined reports to expedite generation of the predefined reports. A predefine report is a report with content predefined by an administrator. For example, a predefined report is a video viewing report with predefined contents such as identifying the number of total video views and unique video views (e.g., views from unique users) for a video. The reporting module 485 receives a selection of a predefined report from a user, retrieves analytics data (e.g., video analytics data) from the analytic store 420 and generates the selected predefined report.

Alternatively, the reporting module 485 receives a description of a report from the communication device 450, allowing a user (e.g., a publisher of a video) to specify parameters for generating a customized report. A customized report is a report customized by a user. For example, a customized report is a report describing one or more of video analytics data within a specified geographic location, user interactions with features customized by a publisher in the custom media player 115, the frequency with which users perform certain types of interaction with a custom media player 115 and how the customization of the custom media player 115 affects the views of the video, etc. In one embodiment, the reporting module 485 provides a customized report to a publisher showing user interactions with a customized feature in the custom media player 115.

In one embodiment, the parameters for generating a report are metrics associated with custom events. For example, the parameters for generating a report are metrics such as "video views" and "viewing 50% of a video" so that a report associated with total video views and viewing 50% of a video will be generated. In one embodiment, the report describes metrics for social features such as the number of times a video was shared, the number of times a video was liked, the number of times a video was favorite, etc. The reporting module 485 retrieves values for the metrics and geographic information related to the custom events from the analytics store 420. The reporting module 485 constructs one or more of charts, diagrams and tables using the values of the metrics and the geographic information. For example, the reporting module 485 generates a table including fields such as the total number of video views for a video, the total number of video views with a viewing of 50% of the video and the number of videos views for different geographic locations. The reporting module 485 generates a report using the charts, diagrams and tables by incorporating the charts, diagrams and tables into the report. In one embodiment, the reporting module 485 also retrieves historical report data or historical analytics data from the analytics store 420 to generate a historical report based on historical data.

The analytics store 420 is a persistent storage device that stores data received from one or more of a user device 160, a custom media player 115, the analytics engine 125 and the communication device 450. For example, the analytics store 420 stores one or more of video IDs, video versions, metrics for custom events, event data describing custom events, location data with video URLs, geographic information for custom events, other analytics data received from the analytics engine 125 such as video analytics data, report data received from the reporting module 485 and graphics data including graphics shown on a user interface.

In one embodiment, the analytics store 420 stores analytics data using a visit identifier, so that interactions with web pages and video data during a visit are maintained according to the visit identifier. The analytics store 420 is further described below with reference to FIG. 5.

The advertisement storage ("ad storage") 425 is a persistent storage device that stores data for playback of an ad. For example, the ad storage 425 stores one or more ads to be displayed before, during or after playback of a video. In one embodiment, the ad storage 425 stores metadata for an ad (e.g., a title, a keyword and a description for the ad), allowing the ad determination module 465 to determine an ad for a video by matching the metadata of the ad against the metadata of the video. For example, the ad determination module 465 compares a keyword describing the video with keywords for the ads stored in the ad storage 425 and selects an ad with the same keyword as the video. In another embodiment, the ad storage 425 stores rules for displaying advertisements as pre-roll ads (e.g., ads played before playing a video), mid-roll ads (e.g., ads played in the middle of playing a video) and post-roll ads (e.g., ads played after playing a video).

Analytics Store 420

Figure 5:
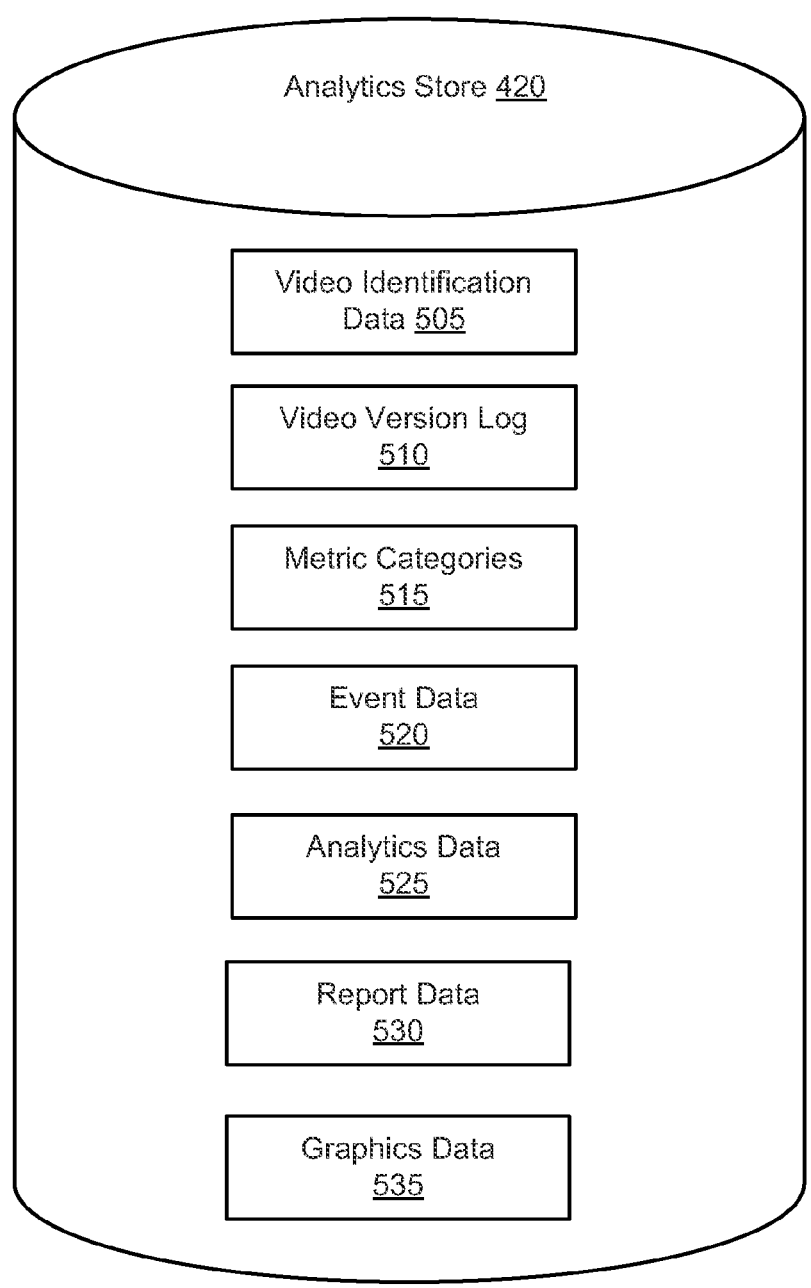
FIG. 5 is a block diagram illustrating one embodiment of an analytics store.

FIG. 5 is a block diagram illustrating one embodiment of the analytics store 420. In the depicted embodiment, the analytics store 420 includes video identification data 505, a video version log 510, metric categories 515, event data 520, analytics data 525, report data 530 and graphics data 535. Persons of ordinary skill in the art will recognize that the analytics store 420 may store additional data not depicted in FIG. 5, such as location data for a video, domain restriction data for a media player 115 and other data to provide functionalities described herein.

The video identification data 505 is data identifying a video. In one embodiment, the video identification data 505 includes one or more of a unique video ID that distinguishes a video from another video, a publisher, a published time and a title for a video.

The video version log 510 is a log recording various video versions for a video. For example, the video version log 510 stores data describing a video version (e.g., a second version of a video) included in a request and an association between the video version and a custom event included the same request. In one embodiment, the video version log 510 includes data describing all the video versions for a video and associations between each video version and the custom events related to the video version.

The metric categories 515 are data describing metrics for custom events. For example, the metric categories 515 stores a list of metrics for custom events received from a custom media player 115. In one embodiment, the metric categories 515 stores metrics for custom events in one of a list, a table, a queue and/or other data structures.

The event data 520 is data describing custom events. For example, the event data 520 describes custom events triggered by user interaction with the custom media player 115. In one embodiment, the event data 520 includes data describing custom events caused by one or more customized features in the custom media player 115 and user interactions with the one or more customized features. For example, the event data 520 includes a user's input to a customized feature of a custom media player 115 such as clicking a social button, etc.

The analytics data 525 are data received from the analytics engine 125. For example, the analytics data 525 includes one or more of video analytics data (e.g., values for metrics), geographic information for custom events and other analytics results generated by the analytics engine 125. The analytics data 525 provides a basis for generating a report to a user. For example, the reporting module 485 retrieves a portion of the analytics data 525 based at least in part on predefined parameters for a report and generates the report using the portion of analytics data 525.

The report data 530 are data describing reports generated by the reporting module 485. The reports include at least two types of reports, i.e., predefined reports and customized reports. In each type, the reports can be sharing reports, discovery reports, comparison reports, daily reports, year-end reports, etc. In one embodiment, the report data 530 also include data describing predefined reports. In another embodiment, the report data 530 include report templates for all styles. In yet another embodiment, the report data 530 are saved for a predetermined period of time. For example, the reporting module 485 uses historical reports to generate new reports, such as year-end reports and comparison reports for a set of different time periods.

The graphics data 535 are graphical data used by the reporting module 485 to perform its function. For example, the graphics data 535 includes graphical data used by the reporting module 485 to generate reports, charts, maps, pictures and any other graphics necessary for the reporting module 485 to perform its function.

Event Diagrams

Figure 6A:
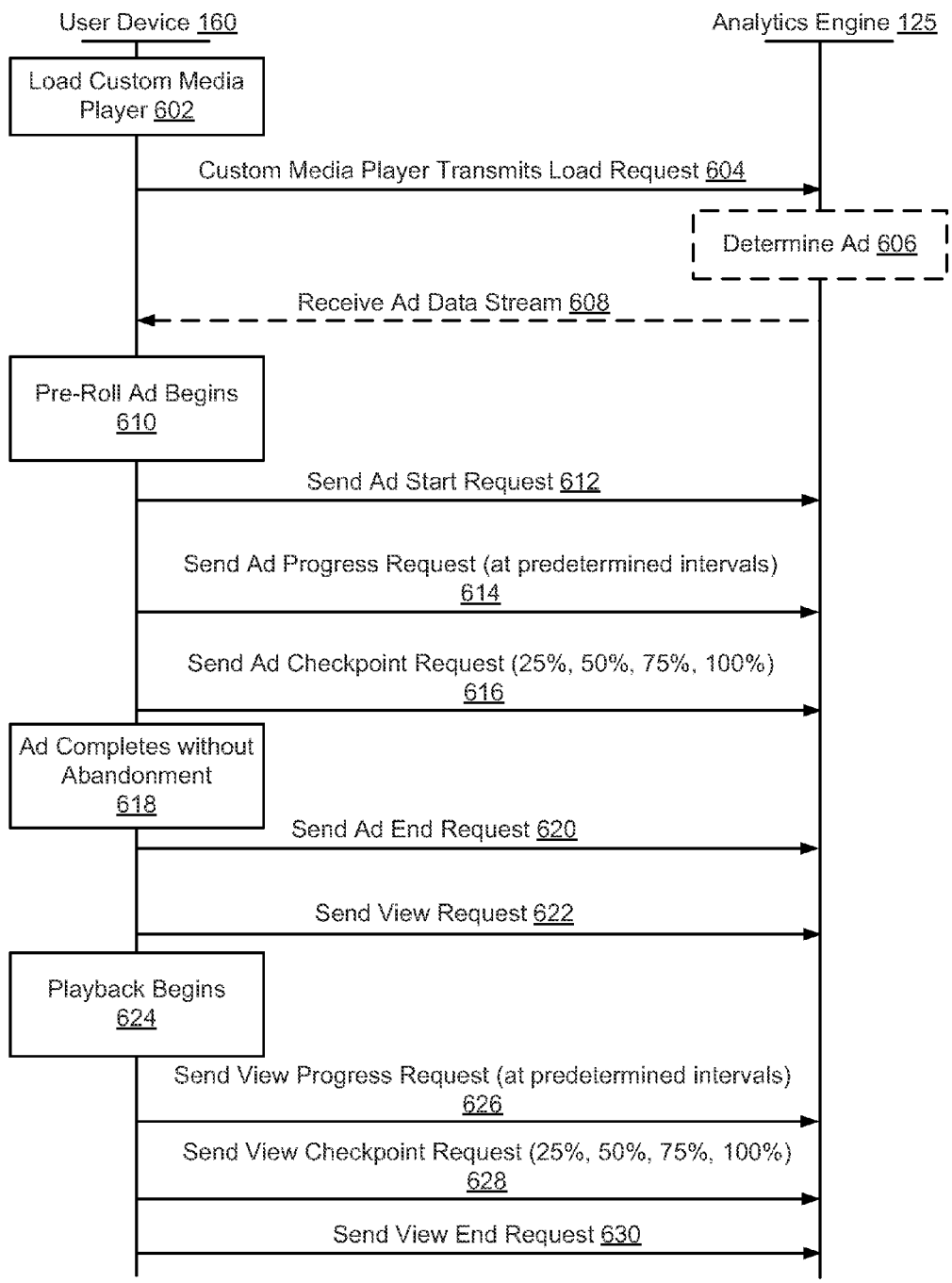
FIGS. 6A-6C are event diagrams illustrating various embodiments of a method for capturing requests from a custom media player.
Figure 6B:
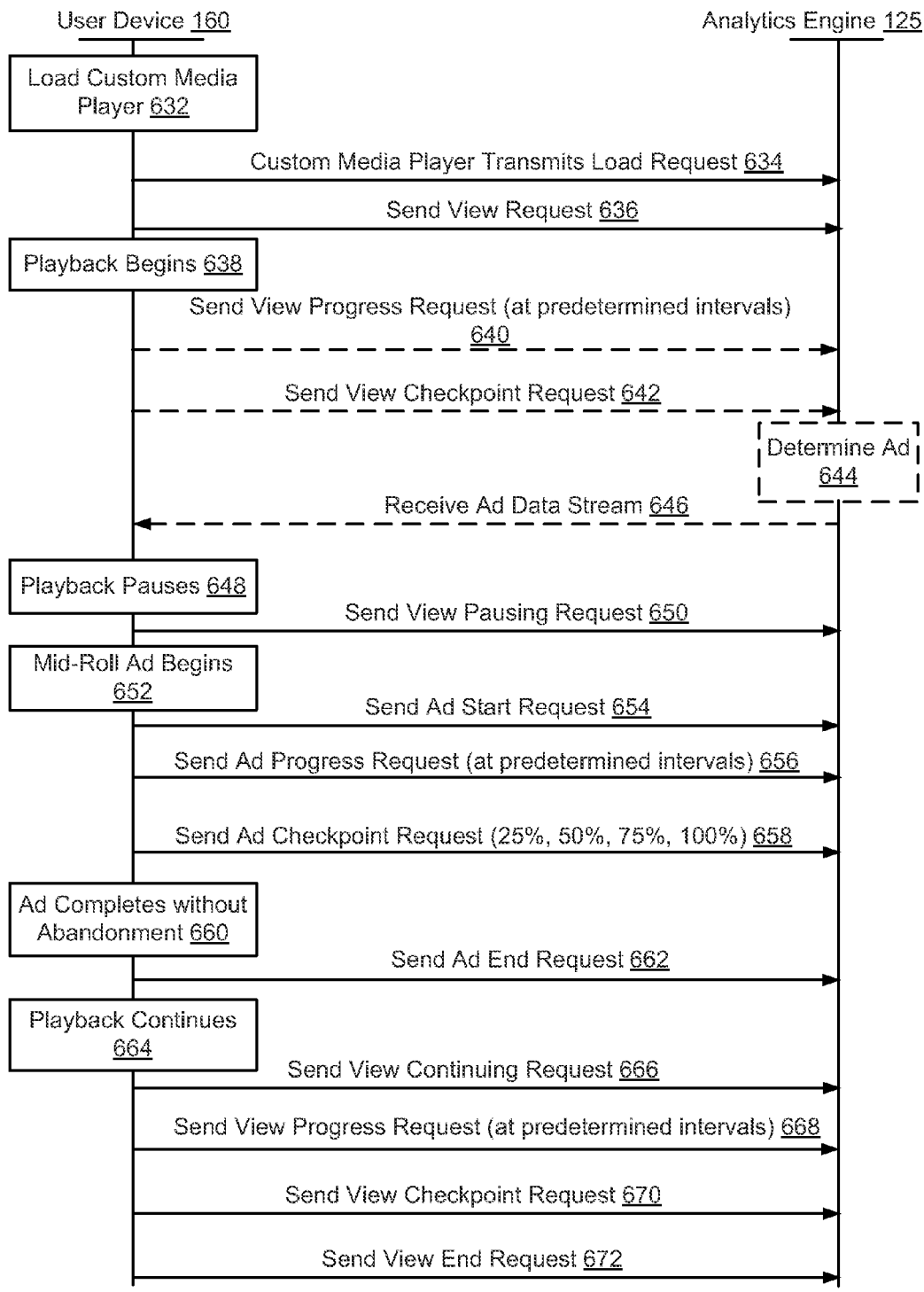
Figure 6C:
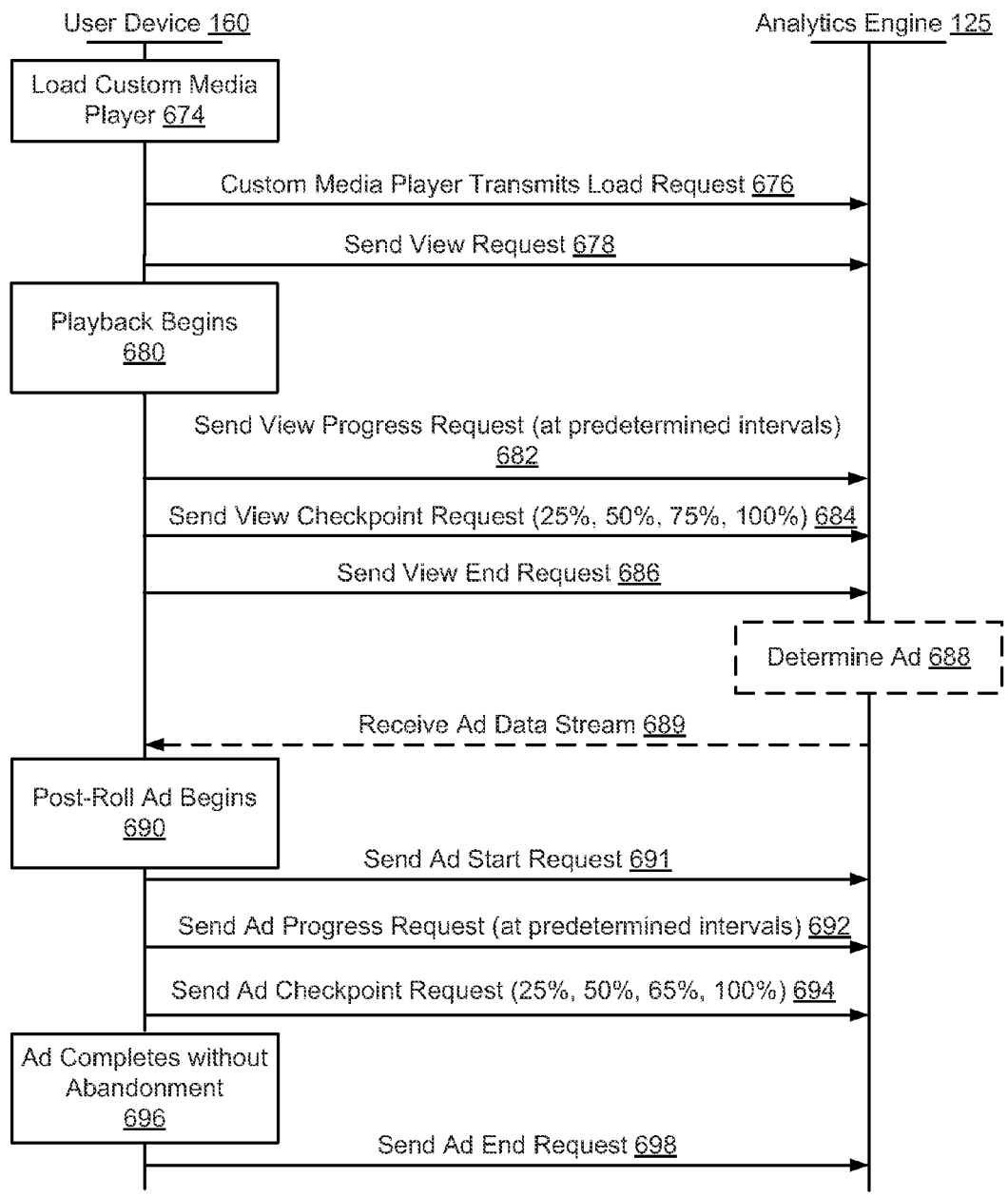
Figure 7:
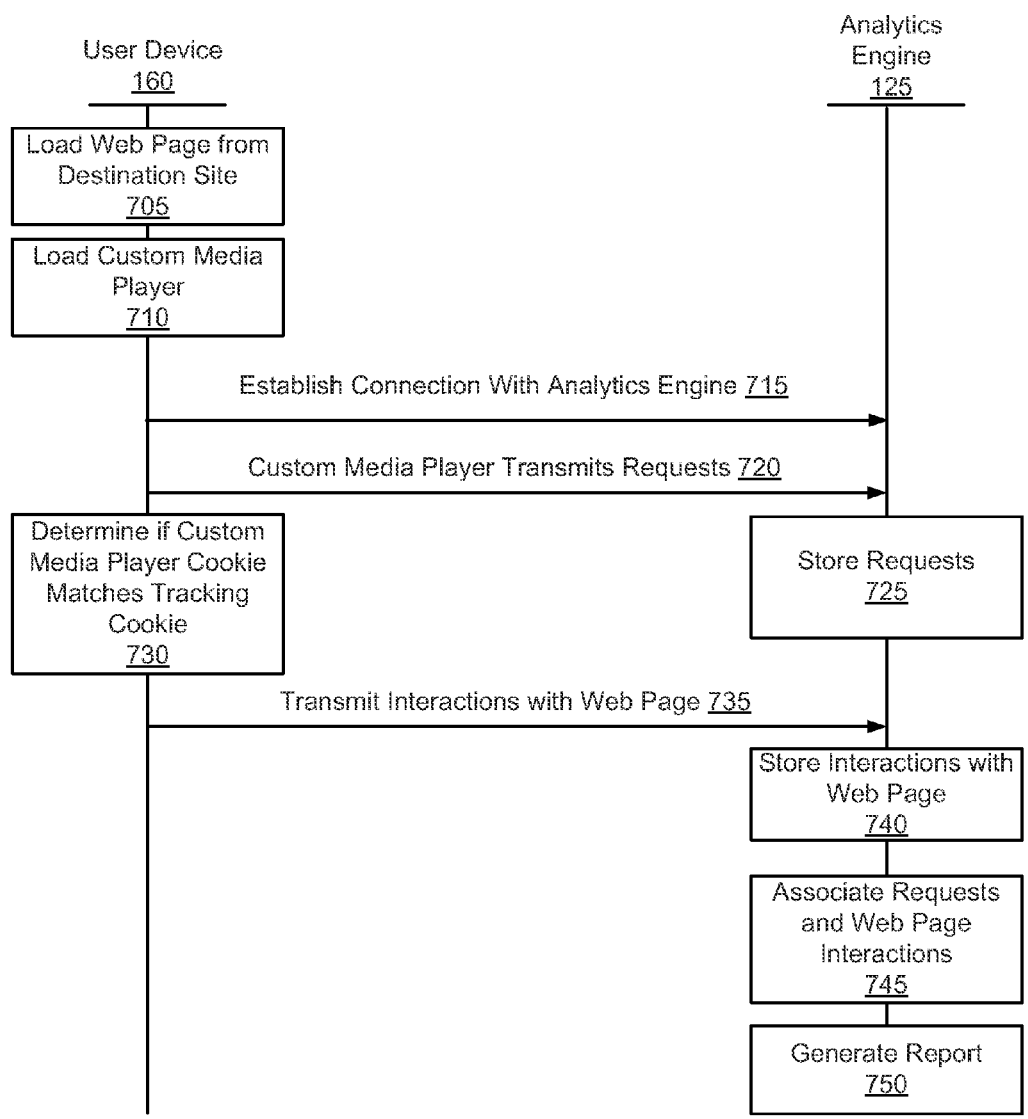
FIG. 7 is an event diagram illustrating one embodiment of a method for capturing web analytic data and requests from a custom media player.

Referring now to FIGS. 6A-7, various event diagrams of the specification will be described according to some embodiments. FIG. 6A illustrates an event diagram of a method for capturing requests from a custom media player 115 according to one embodiment. In the example shown by FIG. 6A, the user device 160 loads 602 a custom media player 115 for presenting a video to a user. The custom media player 115 transmits 604 a load request to the analytics engine 125. The load request is generated by the custom media player 115 responsive to a loading event occurring in the custom media player 115. The load request includes event data describing the loading event.

The analytics engine 125 receives the load request from the user device 160. The analytics engine 125 determines 606 an ad to be played and sends the ad to the custom media player 115. For example, the ad determination module 465 comprised within the analytics engine 125 determines an ad for the video by retrieving an ad stored in the ad storage 425 that matches a keyword of the video. The custom media player 115 receives 608 the data stream for the ad from the analytics engine 125. Steps 606 and 608 are depicted using dashed lines to indicate that they are optional features. In one embodiment, the custom media player 115 receives the data stream for an ad from one of the third party ad server 190 and the ad server 140.

The ad begins 610 playing in the custom media player 115. Since the ad is played before viewing the video, the ad is referred to as a pre-roll ad. The custom media player 115 sends 612 an ad start request to the analytics engine 125. The ad start request includes event data describing that the pre-roll ad has started playback. In one embodiment, the ad start request includes event data describing other custom events that have occurred since the last request was sent (e.g., a user sharing a video, a user favoriting a video, etc.).

While playing the pre-roll ad, the custom media player 115 sends 614 an ad progress request to the analytics engine 125 at predetermined intervals defined by an administrator (e.g., every two seconds). The ad progress request includes event data describing how much of the ad has been played back on the custom media player 115 and any other custom events that have occurred since the last request was sent to the analytics engine 125. The custom media player 115 sends 616 one or more ad checkpoint requests to the analytics engine 125 at one or more checkpoints such as playback of 25%, 50%, 75% and 100% of the total length of the ad. The ad checkpoint request includes event data describing the percentage of the ad that has been played back on the custom media player 115 and any other custom events that occurred since the last request was sent to the analytics engine 125. If the ad completes 618 playing without abandonment, the custom media player 115 sends 620 an ad end request to the analytics engine 125 to indicate completion of playing the ad. The ad end request includes event data describing that the entire ad was played back on the custom media player 115 and any other custom events that occurred since the last request was sent to the analytics server 125.

After the completion of playing the ad, the custom media player 115 sends 622 a view request to the analytics engine 125 to indicate video playback has begun. The view request includes event data describing that the video has begun playback and any other custom events that occurred since the last request was sent to the analytics server 125.

The playback of the video begins 624. The custom media player 115 sends 626 a video progress request to the analytics engine 125 at predetermined intervals. The video progress request includes event data describing how much of the video has been played back and any other custom events that occurred since the last request was sent to the analytics server 125. Additionally, the custom media player 115 also sends 628 one or more view checkpoint requests to the analytics engine 125 at one or more checkpoints such as playback of 25%, 50%, 75% and 100% of the total length of the video. The view checkpoint request includes event data describing the percentage of the video that has been played back on the custom media player 115 and any other custom events that occurred since the last request was sent to the analytics engine 125.

When the video completes playing, the custom media player 115 sends 630 a view end request to the analytics engine 125 to indicate completion of playing the video. The view end request includes event data describing that playback of the video has ended and describing any other custom events that occurred since the last request was sent to the analytics engine 125.

The descriptions for the different requests described above for FIG. 6A are the same for FIGS. 6B and 6C, so these descriptions will not be repeated when describing FIGS. 6B and 6C.

FIG. 6B describes events for playback of a video having a mid-roll advertisement (e.g., an overlay ad) in accordance with one embodiment. The user device 160 loads 632 a custom media player 115 for presenting a video to a user. The custom media player 115 transmits 634 a load request to the analytics engine 125. The custom media player 115 sends 636 a view request to the analytics engine 125. The playback of the video begins 638. The custom media player 115 sends 640 one or more view progress requests to the analytics engine 125 at one or more predetermined intervals. The custom media player 115 sends 642 one or more view checkpoint requests to the analytics engine 125.

The analytics engine 125 determines 644 an ad to be played for the video. The custom media player 115 receives 646 a data stream for playing the ad from the analytics engine 125. Steps 640-646 are depicted using dashed lines to indicate that they are optional features to the method. In one embodiment, the custom media player 115 receives data stream for an ad from one of the third party ad server 190 and the ad server 140.

Responsive to receiving the data stream for the ad, playback of the video in the custom media player 115 pauses 648. The custom media player 115 sends 650 a view pausing request to the analytics engine 125 to indicate that the video is paused in the custom media player 115. The view pausing request includes event data describing the pausing of video playback and event data describing any custom events that have occurred since the last request was sent to the analytics engine 125. The custom media player 115 buffers the data stream for the ad and the ad begins 652 to play. Since the ad is played in the middle of playing the video, the ad is referred to as a mid-roll ad. The custom media player 115 sends 654 an ad start request to the analytics engine 125. The custom media player 115 also sends 656 an ad progress request to the analytics engine 125 at predetermined intervals. The custom media player 115 sends 658 one or more ad checkpoint requests to the analytics engine 125. The custom media player 115 sends 662 an ad end request to the analytics engine 125 to indicate completion of playing the ad 660.

When the ad completes playing, the playback of the video continues 664 and the custom media player 115 sends 666 a view continuing request to the analytics engine 125 to indicate continuing to play the video. The view continuing request includes event data describing that playback of the video has resumed. The view continuing request also includes event data describing any custom events that have occurred since the last request was sent. For example, the event data describes how the user interacted with the ad, such as muting the volume during playback of the ad, minimizing the screen of the advertisement during playback of the ad, clicking links and taking steps to purchase a product featured in the ad, etc.

The custom media player 115 sends 668 a view progress request to the analytics engine 125. The custom media player 115 sends 670 one or more view checkpoint requests to the analytics engine 125 at one or more checkpoints. The custom media player 115 sends 672 a view end request to the analytics engine 125.

FIG. 6C describes events for playback of a video having a post-roll advertisement (e.g., ads played after playing a video) in accordance with one embodiment.

FIG. 6C illustrates an event diagram of a method for capturing requests from a media player 115 according to yet another embodiment. The user device 160 loads 674 a custom media player 115. The custom media player 115 transmits 676 a load request to the analytics engine 125. The custom media player 115 sends 678 a view request to the analytics engine 125. The playback of the video begins 680. The custom media player 115 sends 682 a view progress request to the analytics engine 125 at predetermined intervals. The custom media player 115 sends 684 one or more view checkpoint requests to the analytics engine 125. The custom media player 115 sends 686 a view end request to the analytics engine 125 to indicate completion of playing the video.

Responsive to receiving the view end request, the analytics engine 125 determines 688 an ad to be played. The custom media player 115 receives 689 the ad data stream from the analytics engine 125. Steps 688 and 689 are depicted using dashed lines to indicate that they are optional features of the method. In one embodiment, the custom media player 115 receives data stream for an ad from one of the third party ad server 190 and the ad server 140.

The custom media player 115 buffers the data stream for the ad. The ad begins 690 to play. Since the ad is played after viewing the video, the ad is referred to as a post-roll ad. The custom media player 115 sends 691 an ad start request to the analytics engine 125. The custom media player 115 sends 692 an ad progress request to the analytics engine 125 at predetermined intervals. The custom media player 115 sends 694 one or more ad checkpoint requests to the analytics engine 125. If the ad completes 696 playing without abandonment, the custom media player 115 sends 698 an ad end request to the analytics engine 125.

FIG. 7 illustrates an event diagram of a method for capturing web page interactions and requests that are generated by the media player 115 according to one embodiment. In the example shown by FIG. 7, the user device 160 receives a web page including video data from a destination site 170. Upon receiving the web page, the user device 160 loads 705 the web page. For example, the user device 160 executes data, such as a structured document, to display the web page from the destination site 170. While loading the web page, the user device 160 loads 710 a custom media player 115 included in the web page. For example, the user device 160 executes embed code included in the web page, causing the custom media player 115 to be loaded.

When the custom media player 115 has been loaded, the custom media player 115 establishes 715 a connection with the analytics engine 125 via the network 150. Using the established connection, the custom media player 115 transmits 720 various requests to the analytics engine 125. In one embodiment, the custom media player 115 transmits a request to the analytics engine 125 at predetermined intervals. For example, the custom media player 115 transmits a view progress request to the analytics engine 125 every 10 seconds when playing the video. In another embodiment, the custom media player 115 transmits a request to the analytics engine 125 responsive to an event occurring on the custom media player 115. For example, the custom media player 115 transmits a view end request to the analytics engine 125 in response to the completion of playing a video.

The analytics engine 125 stores 725 the requests in the analytics store 420. As the custom media player 115 transmits additional requests, the analytics engine 125 stores the additional requests. In addition to storing requests, the analytics engine 125 also stores website usage data if the website maintained by the destination site 170 is also monitored by the analytics engine 125. However, even if the website maintained by the destination site 170 is not monitored by the analytics engine 125, the requests are stored to allow monitoring and analyzing interactions with video data.

To determine whether the website maintained by the destination site 170 from which the web pages are also monitored by the analytics engine 125, the media player 115 determines 730 whether a first party cookie included in the web page matches a media player cookie associated with the custom media player 115. If a website is being monitored by the analytics engine 125, web pages comprising the web site include a first party cookie. For example, the first party cookie is associated with a domain used by the destination site 170 to maintain the website. The first party cookie included in a web page monitored by the analytics engine 125 includes a visitor identifier, a visit identifier, a user identifier and data associated with the web page.

However, the analytics engine 125 uses a third-party cookie for the media player cookie. The third-party media player cookie is associated with a domain that differs from the domain used by the destination site 170 to maintain the website. For example, the media player cookie is associated with a domain related to the analytics engine 125. By using a third-party cookie as the media player cookie, the analytics engine 125 allows access to the video data presented by the custom media player 115 to be monitored across different domains. Hence, the third-party media player cookie includes a user identifier that is the same across different websites that present the video data allowing data to be captured about interactions for video data even if the video data is copied to different websites.

Hence, to determine 730 if the first party cookie matches the media player cookie, the custom media player 115 determines whether the user identifier of the first party cookie matches the user identifier of the media player cookie. If the custom media player 115 determines that the first party cookie matches the media player cookie, interactions with the web page (e.g., website usage data) are transmitted 735 from the user device 160 to the analytics engine 125 via the network 150. By determining if the user identifier of the first party cookie and the user identifier of the media player cookie match, the custom media player 115 initially determines whether the website and the video data are commonly owned before transmitting the interactions with the web page to the analytics server 125. Additionally, if the custom media player 115 determines that the user identifier of the first party cookie and the user identifier of the media player cookie match, the custom media player 115 associates a session identifier with the first party cookie and the media player cookie.

If interactions with the web page are received, the analytics server 125 stores 740 website usage data describing the interactions with the web page in the analytics store 420 and associates 745 the stored requests with the website usage data. Thus, the analytics server 125 separately receives the website usage data and the requests and then associates the website usage data and the requests. For example, the analytics engine 125 associates requests and website usage data using the session identifier associated with the first party cookie and the media player cookie. Associating requests from the custom media player 115 and website usage data using the session identifier allows the analytics store 420 to maintain data describing different sessions that include website usage data and requests. The reporting module 485 of the analytics engine 125 generates 755 a report associated with the website usage data and/or requests. For example, the reporting module 485 constructs charts, tables and statistics using the analytics results such as the video analytics data.

However, if the custom media player 115 determines 730 that the media player cookie does not match the first party cookie, website usage data is not transmitted to the analytics engine 125. For example, if the custom media player 115 determines that the user identifier of the first party cookie does not match the user identifier of the media player cookie, website usage data is not transmitted. Thus, even if the website from which the video data is accessed by the user device 160 is not being monitored by the analytics engine 125, the analytics engine 125 still stores 725 requests to enable monitoring of interactions with video data.

Methods

Figure 8:
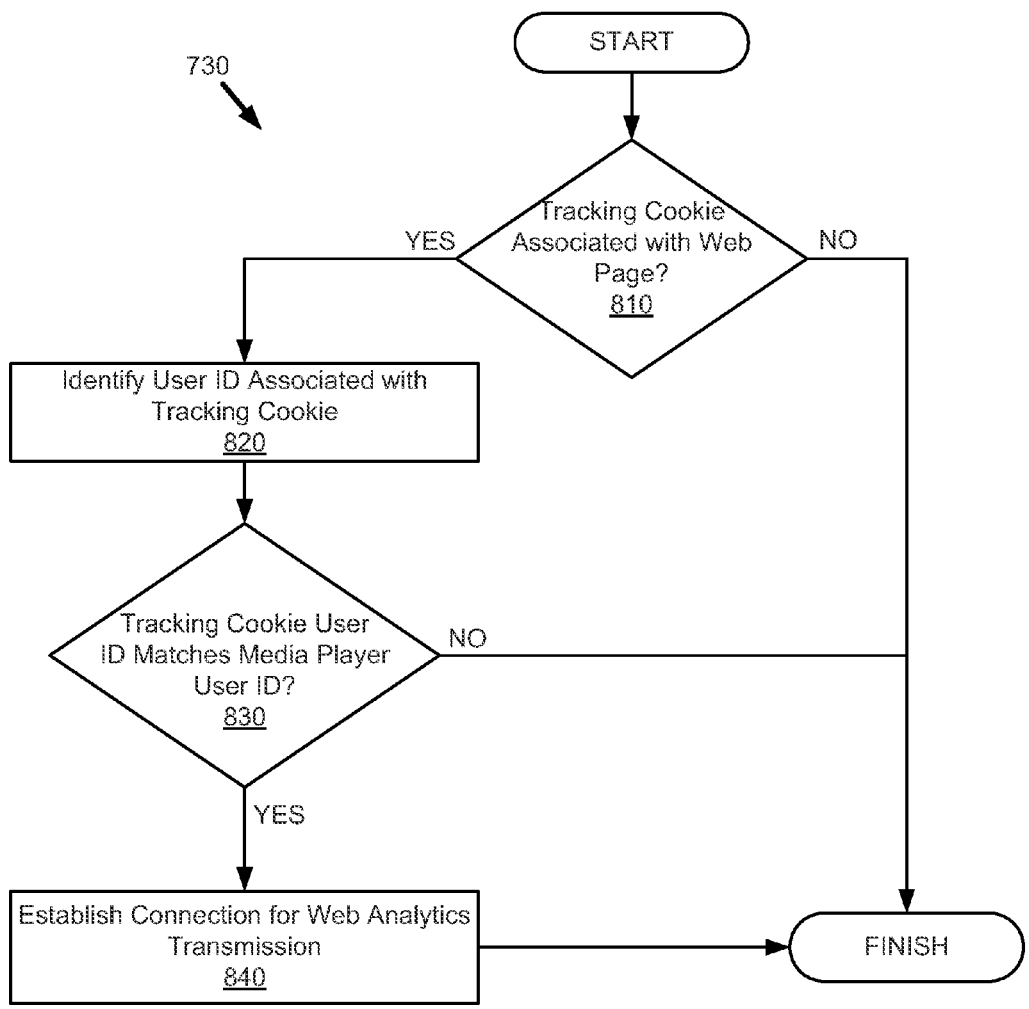
FIG. 8 is a flow diagram illustrating one embodiment of a method for determining whether a media player cookie matches a web page first party cookie.

FIG. 8 is a flow diagram illustrating one embodiment of a method 730 for determining whether a media player cookie matches a web page first party cookie. In one embodiment, the steps identified by FIG. 8 are performed by the custom media player 115 executing on the user device 160.

Initially, the custom media player 115 determines 810 whether a first party cookie is associated with the web page in which the custom media player 115 is launched. For example, the custom media player 115 places a call to the web page to identify the web page first party cookie. If no information identifying the web page first party cookie is received from the web page or if the custom media player 115 is otherwise unable to identify the web page first party cookie, the method ends. Accordingly, website usage data is not transmitted to the analytics engine 125, because the web page is not being monitored by the analytics engine 125. However, requests from the media player 115 are still transmitted to the analytics engine 125 to allow monitoring of interactions for video data.

However, if the custom media player 115 determines 810 that a web page first party cookie is associated with the web page, the custom media player 115 identifies 820 a user identifier ("user ID") associated with the web page first party cookie. For example, the web page communicates the web page first party cookie or data identifying the web page first party cookie to the custom media player 115. The custom media player 115 then identifies 820 the user identifier associated with the web page first party cookie. Alternatively, the web page identifies 820 the user identifier associated with the web page first party cookie.

The custom media player 115 then determines 830 whether the user identifier associated with the web page first party cookie matches a user identifier associated with the media player cookie. If the user identifier associated with the web page first party cookie does not match a user identifier associated with the media player cookie, the method ends and website usage data is not transmitted to the analytics engine 125. For example, if the user identifier associated with the web page first party cookie differs from the media player cookie, the web page and the custom media player 115 are owned by different entities so that website usage data is not transmitted. However, the requests from the custom media player 115 are transmitted to the analytics engine 125.

Responsive to the user identifier associated with the web page first party cookie matching the user identifier associated with the media player cookie, the custom media player 115 initiates a command to establish 840 a connection between the user device 160 and the analytics engine 125. In one embodiment, the custom media player 115 associates a session identifier with the first party cookie and the media player cookie. The session identifier is included with the website usage data and the requests transmitted to the analytics engine 125. Associating a session identifier with the requests and the website usage data allows the analytics engine 125 to associate the received website usage data and requests with each other in a session that includes website usage data and requests.

Figure 9A:
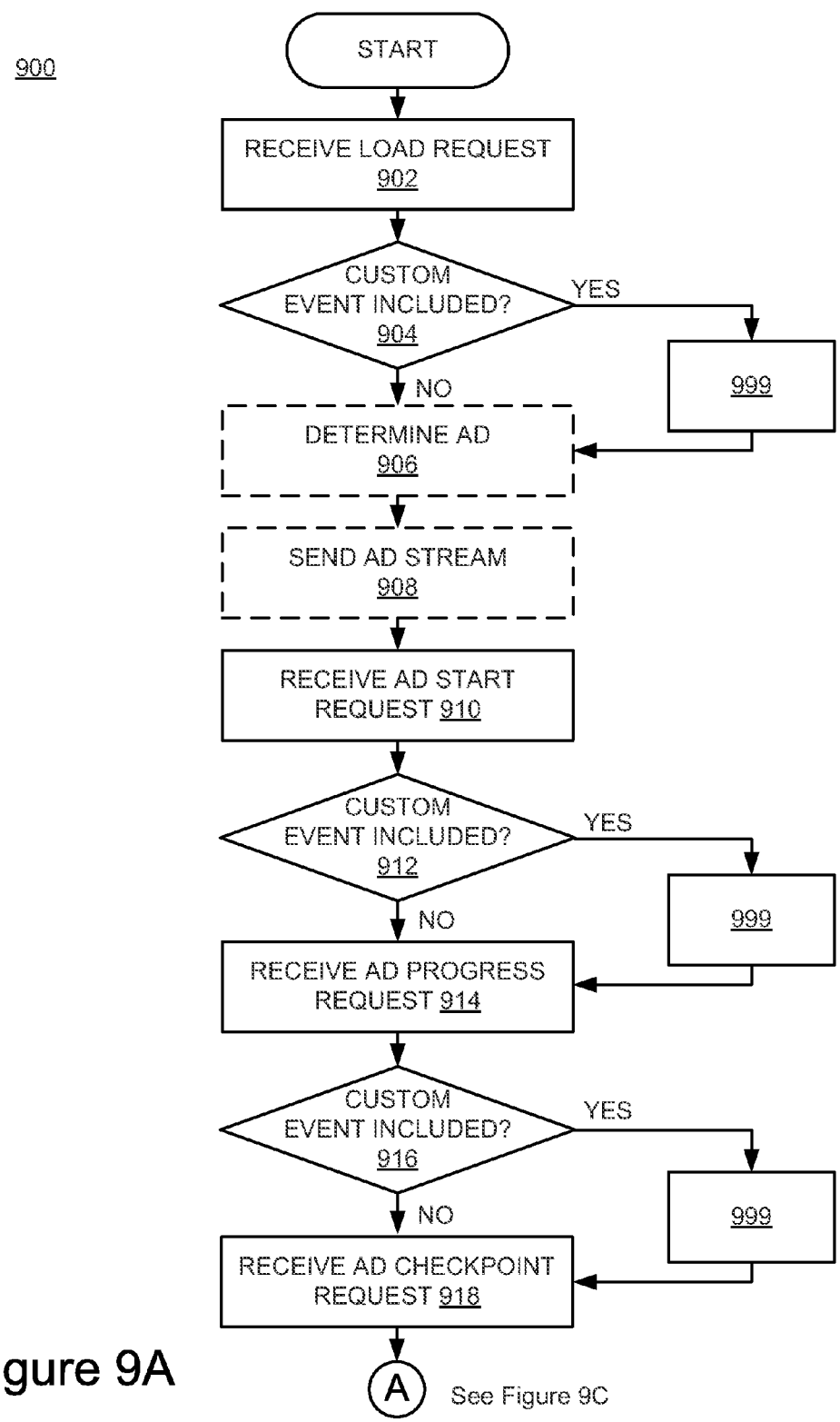
FIGS. 9A-9D are flow diagrams illustrating one embodiment of a method for capturing custom events from requests sent by a custom media player.

FIGS. 9A-9D are flow diagrams illustrating one embodiment of a method 900 for capturing custom events from requests sent by a custom media player 115. Turning to FIG. 9A, the communication module 460 receives 902 a load request from the custom media player 115 launched on a user device 160. The communication module 460 delivers the load request to the request analysis module 470. The request analysis module 470 parses the load request and determines 904 whether a custom event is included in the load request. For example, the request analysis module 470 determines whether event data describing a custom event caused by customization of the custom media player 115 is included in the load request. If a custom event is included, the request analysis module 470 sends the event data describing the custom event to the metric determination module 475 and the method 900 moves to a sub-routine 999. Otherwise, the method 900 moves to step 906.

Figure 9B:
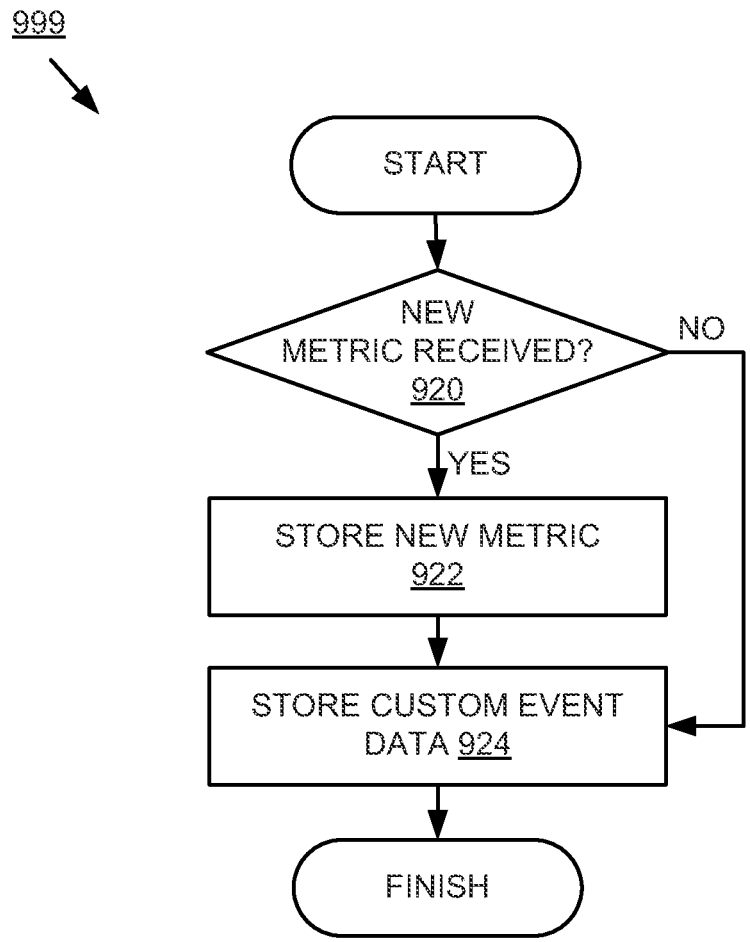

Referring to FIG. 9B, the sub-routine 999 is illustrated according to one embodiment. The metric determination module 475 analyzes event data describing the custom event and determines 920 whether a new metric is received. For example, the metric determination module 475 determines a metric for the custom event and checks whether the determined metric is included in a list of metrics maintained by the metric determination module 475. If the determined metric is not included in the list, the metric determination module 475 determines that a new metric is received. If a new metric is received, the sub-routine 999 moves to step 922. Otherwise, the sub-routine 999 moves to step 924. At step 922, the metric determination module 475 stores the new metric in the analytics store 420. The metric determination module 475 also stores 924 the event data describing the custom event in the analytics store 420.

Turning back to FIG. 9A, at step 906 the ad determination module 465 determines an ad to be played in the custom media player 115. For example, the ad determination module 465 retrieves an ad associated with the video from the ad storage 425. The ad determination module 465 sends 908 the data stream for the ad to the custom media player 115. Steps 906 and 908 are depicted using dashed lines to indicate that they are optional features of the method 900. In one embodiment, the custom media player 115 receives data stream for an ad from one of the third party ad server 190 and the ad server 140.

When the ad starts to play in the custom media player 115, the request analysis module 470 receives 910 an ad start request from the custom media player 115 and determines 912 whether a custom event is included in the ad start request. If a custom event is included, the request analysis module 479 sends event data describing the custom event to the metric determination module 475 and the method 900 moves to the sub-routine 999. If a custom event is not included, the method 900 moves to step 914.

At step 914, the request analysis module 470 receives an ad progress request from the custom media player 115. In one embodiment, the custom media player 115 sends an ad progress request to the request analysis module 470 in predetermined intervals. The request analysis module 470 determines 916 whether a custom event is included in the ad progress request. If a custom event is included, the request analysis module 470 sends event data describing the custom event to the metric determination module 475 and the method 900 moves to the sub-routine 999. If a custom event is not included, the method 900 moves to step 918. At step 918, the request analysis module 470 receives an ad checkpoint request from the custom media player 115. In one embodiment, the custom media player 115 sends one or more ad checkpoint requests to the request analysis module 470 at one or more checkpoints such as 25%, 50%, 75% and 100% of the ad.

Figure 9C:
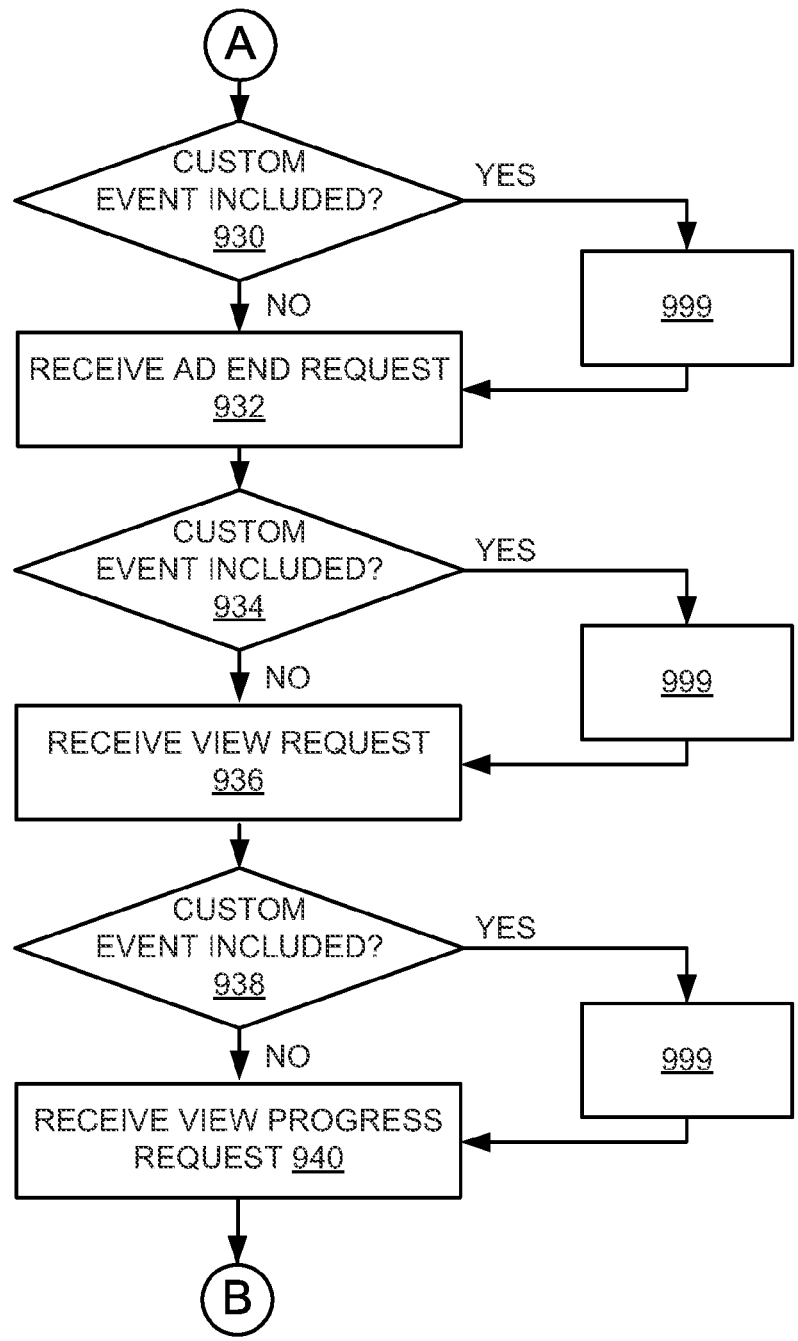

Referring to FIG. 9C, the request analysis module 470 determines 930 whether a custom event is included in the ad checkpoint request. If a custom event is included, the request analysis module 470 sends event data describing the custom event to the metric determination module 475 and the method 900 moves to the sub-routine 999. If a custom event is not included, the method 900 moves to step 932.

When the ad completes playing without abandonment, the request analysis module 470 receives 932 an ad end request from the custom media player 115. The request analysis module 470 determines 934 whether a custom event is included in the ad end request. If a custom event is included, the request analysis module 470 sends event data describing the custom event to the metric determination module 475 and the method 900 moves to the sub-routine 999. If a custom event is not included, the method 900 moves to step 936.

When the video starts to play in the custom media player 115, the request analysis module 470 receives 936 a view request from the custom media player 115. The request analysis module 470 determines 938 whether a custom event is included in the view request. If a custom event is included, the request analysis module 470 sends event data describing the custom event to the metric determination module 475 and the method 900 moves to the sub-routine 999. If a custom event is not included, the method 900 moves to step 940. At step 940, the request analysis module 470 receives a view progress request from the custom media player 115. In one embodiment, the custom media player 115 sends a view progress request to the request analysis module 470 in predetermined intervals.

Figure 9D:
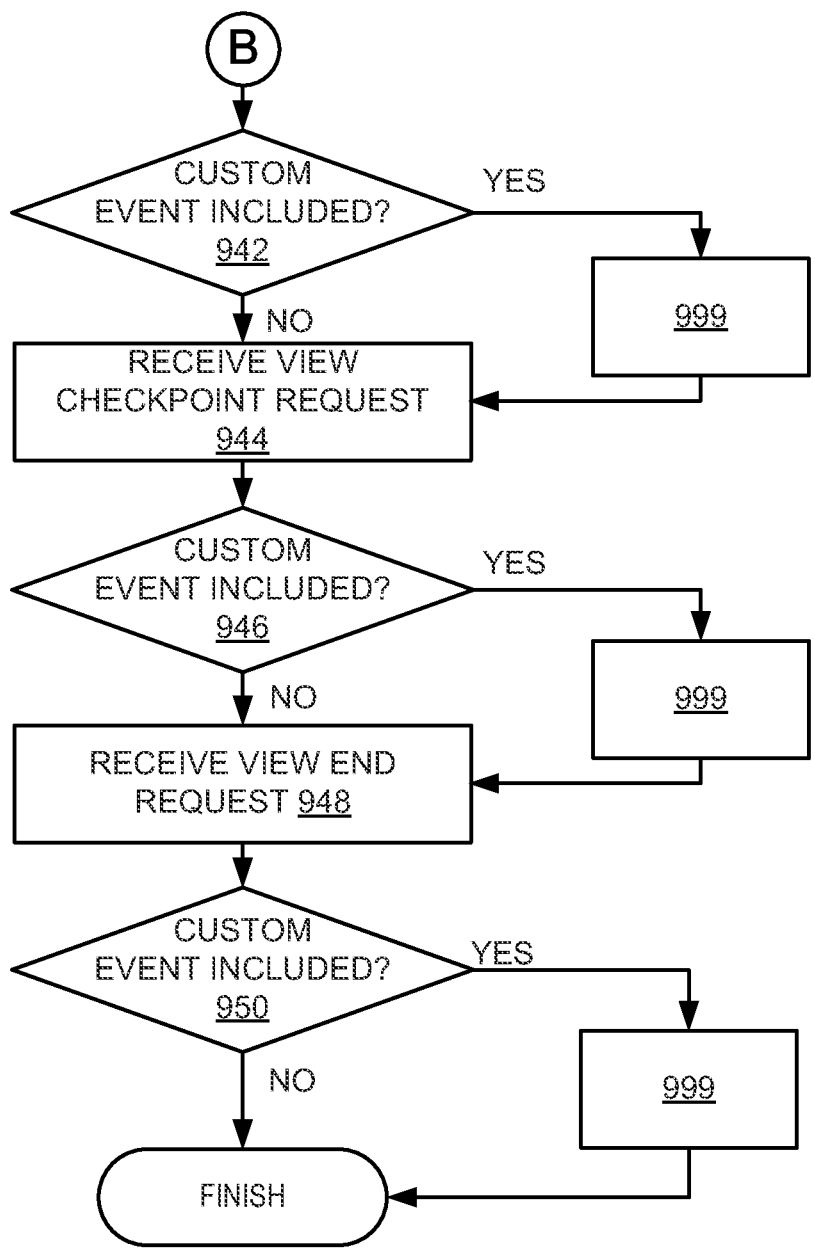

Referring to FIG. 9D, the request analysis module 470 determines 942 whether a custom event is included in the view progress request. If a custom event is included, the request analysis module 470 sends event data describing the custom event to the metric determination module 475 and the method 900 moves to the sub-routine 999. If a custom event is not included, the method 900 moves to step 944.

At step 944, the request analysis module 470 receives a view checkpoint request from the custom media player 115. In one embodiment, the custom media player 115 sends one or more view checkpoint requests to the request analysis module 470 at one or more checkpoints such as 25%, 50%, 75% and 100% of the video. The request analysis module 470 determines 946 whether a custom event is included in the view checkpoint request. If a custom event is included, the request analysis module 470 sends event data describing the custom event to the metric determination module 475 and the method 900 moves to the sub-routine 999. If a custom event is not included, the method 900 moves to step 948.

When the video completes playing without abandonment, the request analysis module 470 receives 948 a view end request from the custom media player 115. The request analysis module 470 determines 950 whether a custom event is included in the view end request. If a custom event is included, the request analysis module 470 sends event data describing the custom event to the metric determination module 475 and the method 900 moves to the sub-routine 999. If a custom event is not included, the method 900 ends.

Figure 10:
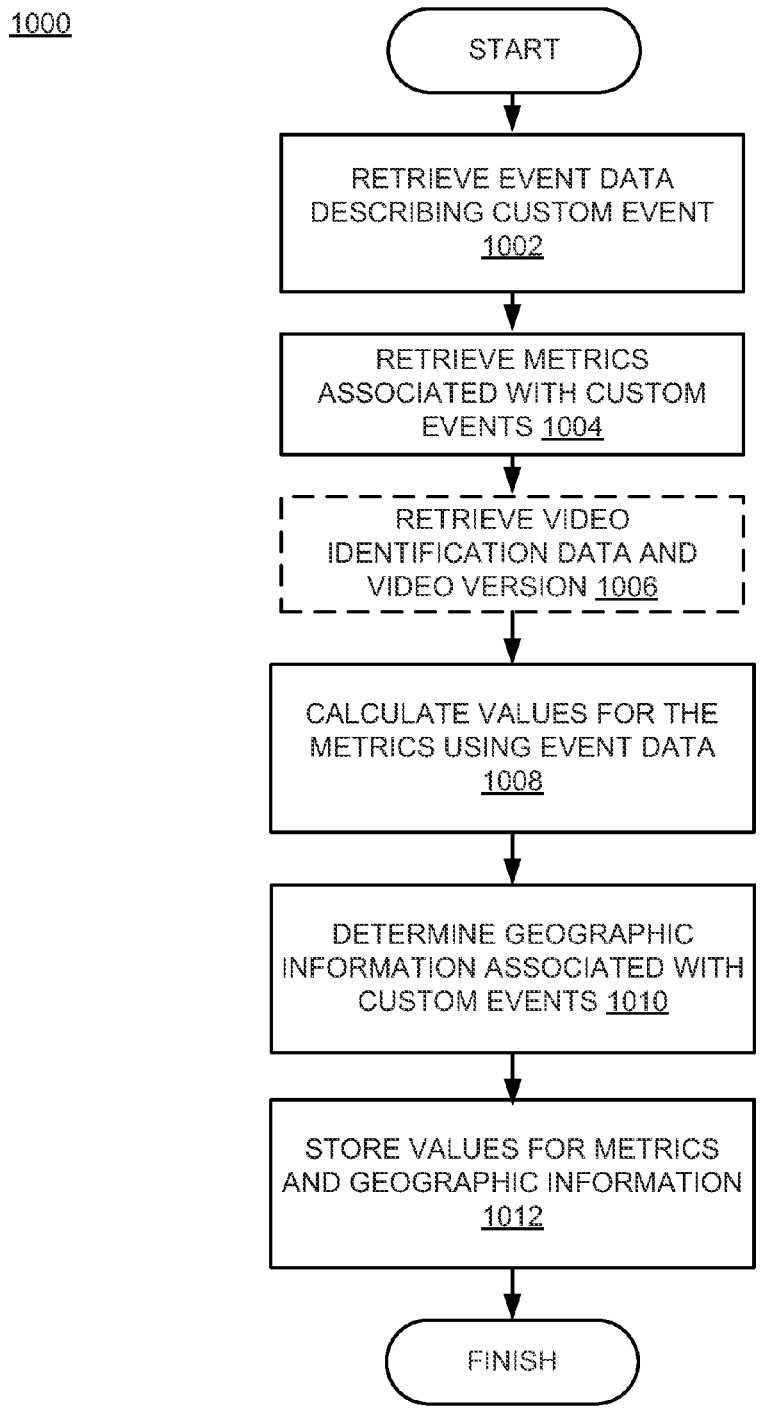
FIG. 10 is a flow diagram illustrating one embodiment of a method for analyzing event data describing custom events.

FIG. 10 is a flow diagram illustrating one embodiment of a method 1000 for analyzing event data describing custom events. In the example shown by FIG. 10, the analytics module 480 retrieves 1002 event data describing custom events from the event data 520 in the analytics store 420. In some examples, the analytics module 480 performs the retrieving periodically (e.g., a day, a week, a month, a season, etc.). In other examples, the retrieving is triggered by a query from a user (e.g., a publisher). In one embodiment, the event data are stored based on metrics for the custom events. In another embodiment, the event data are stored based on a time order.

The analytics module 480 retrieves 1004 metrics associated with the custom events from the metric categories 515 in the analytics store 420. For example, the analytics module 480 retrieves metrics such as video views, viewing 25% of a video, viewing 50% of a video, viewing 75% of a video, viewing 100% of a video and monetizable views. Optionally, the analytics module 480 retrieves 1006 video identification data and video versions associated with the custom events from the analytics store 420.

After retrieving the event data and metrics, the analytics module 480 calculates 1008 values for the metrics using the event data. For example, by using the event data the analytics module 480 calculates the number of total video views, the number of video views that have a viewing of 25% of a video, the number of video views that have a viewing of 50% of a video, the number of video views that have a viewing of 75% of a video, the number of video views that have a viewing of 100% of a video and the number of monetizable views.

The analytics module 480 determines 1010 geographic information related to the custom events. For example, the analytics module 480 determines one or more geographic locations for users that use the custom media player 115 to view a video. The analytics module 480 stores 1012 the values for the metrics as a portion of video analytics data in the analytics data 525 and the geographic information in the analytics store 420.

Figure 11:
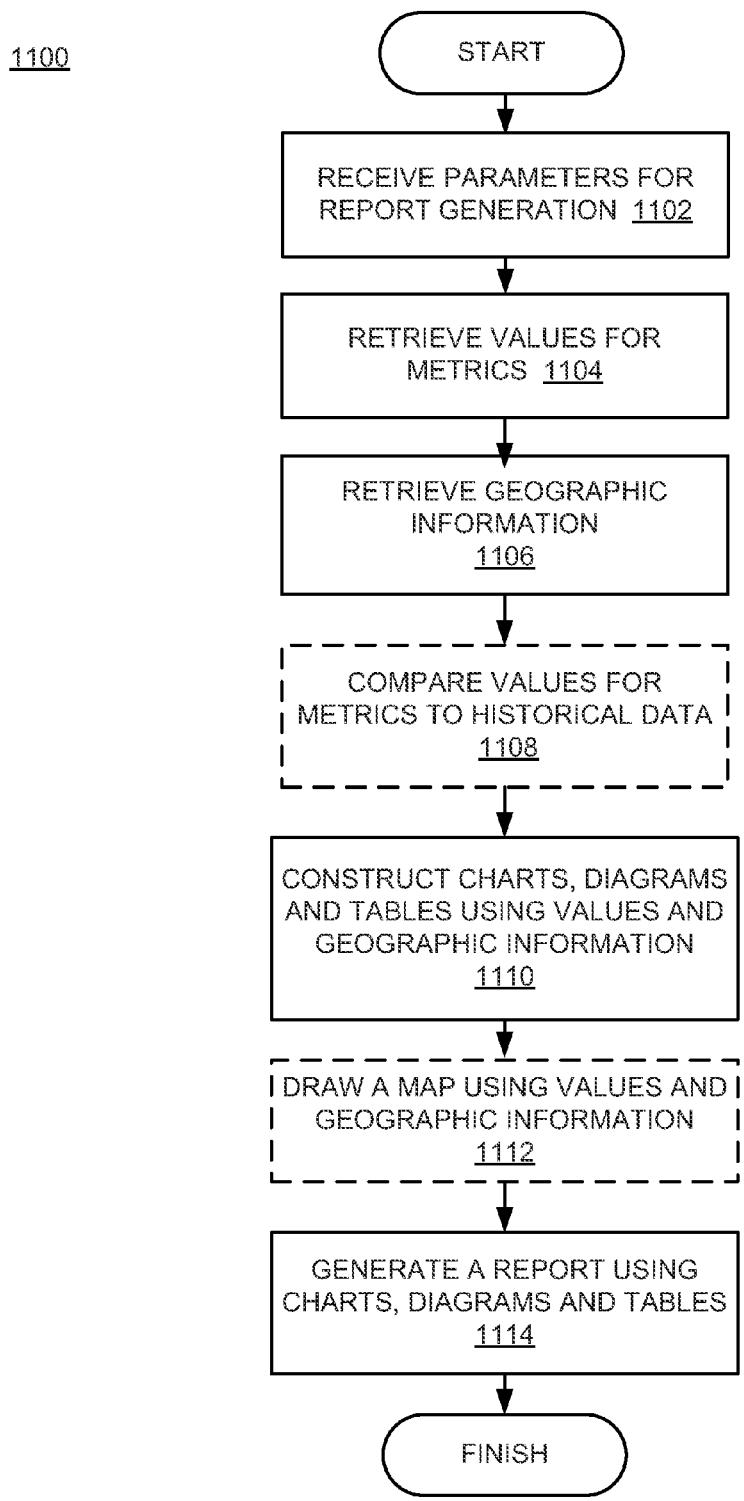
FIG. 11 is a flow diagram illustrating one embodiment of a method for generating a report.

FIG. 11 is a flow chart of one embodiment of a method 1100 for generating a report. The reporting module 485 receives 1102 one or more parameters for generating a report from a user (e.g., a publisher of a video). In one embodiment, the one or more parameters are one or more metrics associated with custom events (e.g., video views, unique video views, age-gating, user login, etc.). The reporting module 485 retrieves 1104 values for the metrics from the analytics store 420. In one embodiment, the reporting module 485 also retrieves 1106 geographic information associated with the custom events from the analytics store 420.

In one embodiment, the reporting module 485 compares 1108 the values for the metrics to historical data describing values for the same metrics in the past. For example, the reporting module 485 compares the number of video views in the last month to the number of video views in the month before the last month. Step 1108 is depicted using a dashed line to indicate that it is an optional feature of the method 1100. The reporting module 485 constructs 1110 one or more of charts, diagrams and tables using the values for the metrics and the geographic information. In one embodiment, the reporting module 485 constructs charts, diagrams and tables according to the type of the report (e.g., a report focusing on video views, a report focusing on advertisements, etc.). Optionally, the reporting module 485 draws 1112 a map depicting the values for the metrics according to the geographic information. For example, the reporting module 485 draws a map showing the distribution of video views according to different geographic locations.

The reporting module 485 generates 1114 a report using the one or more of charts, the diagrams and the tables. For example, the reporting module 485 generates a report by incorporating a chart describing distribution of video views according to different geographic location into the report. In one embodiment, the reporting module 485 arranges the charts, the diagrams and the tables according to a style selected by a user. In another embodiment, the reporting module 485 generates a report using a template for the arrangement of the charts, the diagrams and the tables.

The foregoing description of the embodiments has been presented for the purposes of illustration and description. It is not intended to be exhaustive or to limit the present embodiments to the precise form disclosed. Many modifications and variations are possible in light of the above teaching. It is intended that the scope of the present embodiments be limited not by this detailed description, but rather by the claims of this application. As will be understood by those familiar with the art, the present embodiments may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiments or its features may have different names, divisions and/or formats. Furthermore, as will be apparent to one of ordinary skill in the relevant art, the modules, routines, features, attributes, methodologies and other aspects of the present embodiments can be implemented as software, hardware, firmware or any combination of the three. Also, wherever a component, an example of which is a module, of the present embodiments is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiments are in no way limited to implementation in any specific programming language, or for any specific operating system or environment. Accordingly, the disclosure intended to be illustrative, but not limiting, of the scope of the embodiments, which is set forth in the following claims.

What is claimed is:

1. A method comprising:
   receiving from a publisher,
   by a processing device of a server, metadata for customizing presentation of a social feature with a content item provided by the publisher, the metadata describing a graphic, and an input associated with the social feature to be provided by a user of a custom media player executing on a client device;
   transmitting, to the custom media player one or more instructions that cause the custom media player to present with the content item, in accordance with the metadata, a user interface element comprising the graphic and enabling the user of the custom media player to provide the input associated with the social feature;
   receiving, by the processing device, event data associated with the presentation of the social feature by the custom media player, the event data comprising the input associated with the social feature provided by the user of the custom media player;
   generating a report based on the event data comprising the input associated with the social feature provided by the user of the custom media player, the report describing user interaction with the social feature in the custom media player; and
   providing the report to the publisher.

2. The method of claim 1, wherein the request includes a video identification and a video version.

3. The method of claim 1, wherein the event data pertains to one or more of sharing a video via email, sharing the video via an embed copy, sharing the video via a website or marking the video as a favorite video.

4. The method of claim 1 further comprising:
   determining an advertisement to be presented in the custom media player based on the event data.

5. The method of claim 1 further comprising:
   analyzing the event data to generate video analytics data for the social feature, wherein the video analytics data includes a value for a metric associated with the social feature.

6. A system comprising:
   a network interface device; and
   a processor coupled to the network interface device, the processor to:
   receive, from a publisher, metadata for customizing presentation of a social feature with a content item provided by the publisher, the metadata describing a graphic, and an input associated with the social feature to be provided by a user of a custom media player executing on a client device;
   transmit via the network interface device, to the custom media player one or more instructions that cause the custom media player to present with the content item, in accordance with the metadata, a user interface element comprising the graphic and enabling the user of the custom media player to provide the input associated with the social feature receive, via the network interface device, event data associated with the presentation of the social feature by the custom media player, the event data comprising the input associated with the social feature provided by the user of the custom media player;

generate a report based on the event data comprising the input associated with the social feature provided by the user of the custom media player, the report describing user interaction with the social feature in the custom media player; and provide the report to the publisher.

7. The system of claim 6, wherein the request includes a video identification and a video version.

8. The system of claim 6, wherein the event data pertains to one or more of sharing a video via email, sharing the video via an embed copy, sharing the video via a website or marking the video as a favorite video.

9. The system of claim 6, the processor further to:

determine an advertisement to be presented in the custom media player based on the event data.

10. The system of claim 6, the processor further to:

analyze the event data to generate video analytics data for the social feature, wherein the video analytics data includes a value for a metric associated with the social feature.

11. A computer program product comprising a non-transitory computer readable medium encoding instructions that, in response to execution by a computing device, cause the computing device to perform operations comprising:

receiving from a publisher, by the computing device, metadata for customizing presentation of a social feature with a content item provided by the publisher, the metadata describing a graphic, and an input associated with the social feature to be provided by a user of a custom media player executing on a client device;

transmitting, to a custom media player executing on a client device, one or more instructions that cause the custom media player to present with the content item, in accordance with the metadata, a user interface element comprising the graphic and enabling the user of the custom media player to provide the input associated with the social feature;

receiving, by the processing device, event data associated with the presentation of the social feature by the custom media player, the event data comprising the input associated with the social feature provided by the user of the custom media player;

generating a report based on the event data comprising the input associated with the social feature provided by the user of the custom media player, the report describing user interaction with the social feature in the custom media player; and providing the report to the publisher.

12. The computer program product of claim 11, wherein the request includes a video identification and a video version.

13. The computer program product of claim 11, wherein the event data pertains to one or more of sharing a video via email, sharing the video via an embed copy, sharing the video via a website or marking the video as a favorite video.

14. The computer program product of claim 11, wherein the instructions encoded in the computer readable medium when executed cause the computing device to perform operations comprising:

determining an advertisement to be presented in the custom media player based on the event data.

\* \* \* \* \*